United States Patent
Strobel et al.

(10) Patent No.: US 9,695,051 B2
(45) Date of Patent: Jul. 4, 2017

(54) FORM OF SILICON AND METHOD OF MAKING THE SAME

(71) Applicant: CARNEGIE INSTITUTION OF WASHINGTON, Washington, DC (US)

(72) Inventors: Timothy A. Strobel, Washington, DC (US); Duck Young Kim, Washington, DC (US); Oleksandr O. Kurakevych, Washington, DC (US)

(73) Assignee: CARNEGIE INSTITUTION OF WASHINGTON, Washington, DC (US)

( * ) Notice: Subject to any disclaimer, the term of this patent is extended or adjusted under 35 U.S.C. 154(b) by 0 days.

(21) Appl. No.: 14/903,131

(22) PCT Filed: Jul. 8, 2014

(86) PCT No.: PCT/US2014/045745
§ 371 (c)(1),
(2) Date: Jan. 6, 2016

(87) PCT Pub. No.: WO2015/006322
PCT Pub. Date: Jan. 15, 2015

(65) Prior Publication Data
US 2016/0176716 A1    Jun. 23, 2016

Related U.S. Application Data

(60) Provisional application No. 61/843,581, filed on Jul. 8, 2013, provisional application No. 61/874,582, filed on Sep. 6, 2013.

(51) Int. Cl.
*C01B 33/02* (2006.01)
*C01B 33/00* (2006.01)
*C01B 33/021* (2006.01)
*C01B 33/06* (2006.01)

(52) U.S. Cl.
CPC .............. *C01B 33/02* (2013.01); *C01B 33/00* (2013.01); *C01B 33/021* (2013.01); *C01B 33/06* (2013.01)

(58) Field of Classification Search
CPC ....... C01B 33/02; C01B 33/06; C01B 33/021; C01B 33/00
See application file for complete search history.

(56) References Cited

U.S. PATENT DOCUMENTS

| 5,800,794 A | 9/1998 | Tanigaki et al. |
| 6,461,581 B1 | 10/2002 | Eguchi et al. |
| 7,303,736 B2 | 12/2007 | Williamson et al. |
| 2009/0263958 A1 | 10/2009 | Nolas et al. |
| 2012/0295160 A1 | 11/2012 | Miller et al. |

FOREIGN PATENT DOCUMENTS

WO    WO 00/17104 A1    3/2000

OTHER PUBLICATIONS

Kurakevych et al., "Na—Si Clathrates Are High-Pressure Phases: A Mel-Based Route to Control Stoichiometry and Properties," Crystal Growth and Design 2013, 13, 303-307. Published Dec. 3, 2012.*
Extended European Search Report dated Feb. 10, 2017, issued to European Application No. 14823783.7.
Written Opinion and International Search Report issued in a corresponding International Application No. PCT/US2014/045745 dated Oct. 24, 2014.
Stefanoski et al., "E3.05 A new allotrope of silicon with a quasidirect band gap for solar energy conversion technologies," Symposium E: Earth-Abundant Inorganic Solar-Energy Conversion, Apr. 22, 2014 retrieved from https://mrsspring14.zerista.com/event/member/107979.
Chinese Office Action dated Mar. 15, 2017, issued to the corresponding Chinese Application No. 201480049395.2.
Abdelaziz Ammar et al., "On the clathrate form of elemental silicon, $Si_{136}$: preparation and characterization of $Na_xSi_{136}$ (x→0)", Jan. 6, 2004, Solid State Sciences 6 (2004) pp. 393-400.
N. A. Borshch et al., "Influence of the Special Features of Atomic Structure of $Si_{24}$ and $MeSi_{24}$(Me = Na OR K) Nanoparticles on Their Electron Properties", 2006, Russian Physics Journal, vol. 49, No. 2.

\* cited by examiner

*Primary Examiner* — Anthony J Zimmer
(74) *Attorney, Agent, or Firm* — Stein IP, LLC

(57) ABSTRACT

The invention relates to a new phase of silicon, $Si_{24}$, and a method of making the same. $Si_{24}$ has a quasi-direct band gap, with a direct gap value of 1.34 eV and an indirect gap value of 1.3 eV. The invention also relates to a compound of the formula $Na_4Si_{24}$ and a method of making the same. $N_a4Si_{24}$ may be used as a precursor to make $Si_{24}$.

16 Claims, 21 Drawing Sheets

Au/Ta capsule after sample recovery showing unreacted capsule material.

p-T domain of applicability of Ta as a capsule material a b

FORM OF SILICON AND METHOD OF MAKING THE SAME

STATEMENT OF INTEREST

This invention was made with Government support under Grant Number W911NF-11-1-0300 awarded by the U.S. Army Contracting Command and Grant Number DOE DE-SC0001057 awarded by the U.S. Department of Energy. The U.S. Government has certain rights in the invention.

FIELD OF THE INVENTION

The present invention relates generally to a new form of silicon, precursors that are useful in making a new form of silicon, and methods of making these compounds. More specifically, the invention is concerned with $Si_{24}$, a new form of silicon, and $Na_4Si_{24}$, a new compound that is useful as a precursor to make $Si_{24}$. The invention also relates to other sodium-silicon compounds, including sodium-silicon clathrate compounds, and new methods of making the same.

BACKGROUND OF THE INVENTION

Silicon is the second most common element found in the earth's surface. It has a wide variety of commercial uses, including in electronics and semiconductors, in metallurgical materials, and in photovoltaics. Silicon has a large impact on the world economy, and much of modern technology depends on it.

"Normal" silicon has a diamond structure, d-Si. Despite the prevalence of "normal" silicon in the photovoltaic industry, silicon is actually a relatively poor absorber of sunlight. This is because d-Si has an indirect band gap of 1.1 eV and a direct bandgap of 3.2 eV. That is, d-Si cannot directly absorb photons with an energy level less than 3.2 eV to promote electrons into the conduction band; it requires assistance from lattice phonons to transfer momentum of electrons to the conduction band, which are excited by photons with an energy level greater than 1.1 eV. This large disparity between the indirect and direct gaps means that thick layers of silicon are required to absorb light. As a consequence, efficiency decreases and cost increases.

For at least the above reasons, there is a need for new phases of silicon with direct or quasi-direct band gaps (nearly degenerate indirect and direct gaps) to improve the light absorption efficiency and lower manufacturing costs. In addition, optically active silicon (silicon capable of readily absorbing and emitting light) is desired in many optical applications (for example, diodes, lasers, sensors, etc.).

SUMMARY

Broadly stated, the present invention provides a new and improved form of silicon, $Si_{24}$, and a method of making this compound.

This new phase of silicon ($Si_{24}$, and also referred to as $Si_6$, oC24 silicon or Cmcm-24 silicon) has a quasi-direct band gap (direct gap value is 1.34 eV, indirect gap value is 1.30 eV), making it an excellent candidate for photovoltaic applications and other optical and electronic applications.

While formally an indirect gap material, $Si_{24}$ has a nearly identical direct gap (1.30 eV vs. 1.34 eV) and is a much better absorber of sunlight than d-Si. Therefore, this material will be highly desirable in the photovoltaic industry. It is also worth noting that the maximum quantum efficiency for a single-junction solar cell is 33.7% (Shockley-Queisser limit) and occurs at a band gap of 1.34 eV, the same value for $Si_{24}$.

The present invention also provides a new compound of the formula $Na_4Si_{24}$ (also referred to as $NaSi_6$) and a method of making the same. $Na_4Si_{24}$ may be used as a precursor to make $Si_{24}$.

In one embodiment, the invention relates to a method of producing $Si_{24}$ including the following steps: forming a $Na_4Si_{24}$ precursor by reacting a mixture of silicon and sodium at a pressure between about 7 GPa and about 15 GPa and a temperature between about 320° C. and about 1500° C.; and subjecting the resultant $Na_4Si_{24}$ precursor to vacuum conditions at a temperature from about 40° C. to about 500° C. to produce $Si_{24}$. In an embodiment of the invention, the pressure does not exceed about 12 GPa in preparing the precursor so as to minimize product decomposition. However, a pressure up to about 15 GPa may be effective if applied for a shorter period of time.

In one embodiment, the vacuum conditions are maintained below a pressure of about $1 \times 10^{-2}$ torr. In another embodiment, the vacuum conditions are held below a pressure of about $1 \times 10^{-5}$ torr. However, higher or lower pressures may be used.

In one embodiment, the resultant $Na_4Si_{24}$ may be subjected to vacuum conditions for a time ranging from about 1 hour to about 1 day. However, in another embodiment, the resultant $Na_4Si_{24}$ may be subjected to vacuum conditions for a time ranging from about 1 day to about 10 days.

In one embodiment, the silicon and the sodium used to produce $Na_4Si_{24}$ are in the elemental form. In another embodiment, the silicon and the sodium are in the form of a compound.

In one embodiment, the invention relates to a method of producing $Na_4Si_{24}$ by reacting a mixture of silicon and sodium at a pressure between about 8 GPa and about 12 GPa, and a temperature between about 700° C. and about 1000° C.

It is to be understood that both the foregoing general description and the following detailed description are exemplary and explanatory and are intended to provide further explanation of the invention as claimed.

DESCRIPTION OF THE DRAWINGS

The invention is more fully described by reference to the accompanying drawings wherein:

FIG. 12A provides PXRD data (points) and Rietveld refinements (upper lines) for $Na_4Si_{24}$ (top) and $Si_{24}$ (bottom). Lower lines indicate difference between experimental data and refinement. The upper tick marks indicate reflection positions for $Na_4Si_{24}$ (top) and $Si_{24}$ (bottom). The lower tick marks indicate reflection positions for d-Si (1.5 wt % impurity in top panel). FIG. 12B provides EDXS spectrum obtained from iridium coated $Si_{24}$ sample. No sodium is detected (position of red arrows). Carbon and oxygen originate from organic contamination and a native oxide layer, respectively. Inset shows SEM/EDXS mapping image of ~5 micron crystals. Purple color indicates silicon. FIG. 12C shows the effect of sodium removal on lattice constants and table of measured (EXP) and calculated (DFT) lattice parameters for $Na_4Si_{24}$ and $Si_{24}$.

FIG. 15A provides a schematic of compositional change from $Na_4Si_{24}$ (left) to $Si_{24}$ (right). Na atoms are shown in purple and silicon in yellow. FIG. 15B shows an $Si_{24}$ unit cell exhibiting three crystallographically unique positions in each color. FIG. 15C provides a fractional view of $Si_{24}$ emphasizing its channel structure. Channels are formed by eight-member rings along the a-axis, which are linked by six-membered rings on the top and sides. These channels are connected along the c-axis by five-membered rings.

FIG. 16A shows calculated $Si_{24}$ band structure (PBE+ $G_0W_0$). FIG. 16B provides a zoomed in region of band gap. Arrows indicate direct ($E_d$) and indirect ($E_i$) gaps. FIG. 16C shows electrical conductivity of $Na_4Si_{24}$ and $Si_{24}$ (inset shows fit of intrinsic conductivity region with band gap of 1.3 eV). FIG. 16D provides Tauc plots of Kubelka-Munk absorption (K/S) for $Si_{24}$ obtained from optical reflectivity measurements. Absorption edges are observed at 1.29 eV and 1.39 eV assuming indirect and direct electronic transitions, respectively.

DETAILED DISCUSSION

Figure 1:
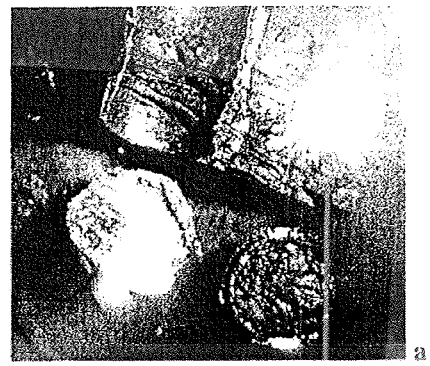
FIG. 1 provides a photograph of an Au/Ta capsule after sample recovery showing unreacted capsule material.

Applicants first describe certain silicon clathrates and new and unexpected methods of making such compounds.

Silicon clathrates (1) (or simply clathrates throughout this application) are analogues to the water-based clathrate hydrates, (2) often crystallizing as high-symmetry cubic structures. Si atoms within these compounds take on an $sp^3$ hybridization state to form a covalent network of polyhedral cavities that host appropriately sized "guest" atoms. The alkali and alkaline earth metals can be intercalated into these cages that extend in three dimensions. The cubic structure I (sI, Pm3n, a ~10.2 Å) clathrate contains 2 small $5^{12}$ cages (12 pentagonal faces) and 6 larger $5^{12}6^2$ cages (12 pentagonal faces and 2 hexagonal faces) with 46 silicon atoms per unit cell, whereas a unit cell of cubic structure II (sII, Fd3m, a ~14.7 Å) is composed of 16 $5^{12}$ cages and 8 large $5^{12}6^4$ cages with 136 Si atoms. The rigid covalent 3-D network and intercalation nature of these compounds give rise to a combination of interesting properties, including remarkable incompressibility (3, 4); glasslike thermal conductivity (5); metallic, semi- (6), and superconductivity (7, 8); photovoltaic properties (6); and potential for hydrogen storage materials (9).

Most known silicon clathrates have been synthesized at ambient pressure or under deep vacuum using ZintI compounds as precursors or through different types of chemical reactions (1, 6) Up to now, chemical decomposition (arc-remelting or heating in vacuum/Ar atmosphere) remains the principal method for Na—Si clathrate synthesis (6, 10, 11). Later, chemical oxidation was proposed as an alternative route (12), as well as spark plasma treatment of the $Na_4Si_4$ precursor. Although single crystals of some Si clathrates can be grown by the techniques just mentioned (10, 13), the equilibrium synthesis from a melt remains a challenging task for well-controlled crystal growth. The knowledge of thermodynamic stability domains in terms of composition, temperature, and pressure is, therefore, of primary importance.

The generalized thermodynamic stabilities of silicon clathrate phases are not clear. Guest-free Si clathrates have been predicted to be stable only at negative pressures below −3 GPa (14, 15), (a direct analogy may be drawn between the negative pressure stability of empty silicon and water-based clathrates). While some Ba- and halogen-based silicon clathrates can be synthesized at high pressure (16, 17), ab initio results on the high-pressure stability of Na—Si clathrates suggest that these phases are thermodynamically unstable with respect to decomposition at high-pressure conditions (10), Thus, the p-T domains for thermodynamic stability and the possibility for equilibrium crystal growth need clarification.

At present, the phase equilibria for the Na—Si system remain the least understood as compared with other clathrate systems (e.g., Ba—Si). Sodium is the lightest metal that is known to intercalate the Si cages alone, and its understanding may lead, for example, to the synthesis of Li-, Mg-, and Be-bearing clathrates. The experimentally established binary phase diagram at ambient pressure contains only one congruently melting compound of Na and Si, sodium silicide ($Na_4Si_4$), and clathrate formation has not been observed under (quasi-) equilibrium conditions (18). In situ study of Na—Si clathrate growth under high-temperature, high-vacuum conditions allows one to conclude that its formation is principally determined by mutual structural relationships of phases and dynamic phenomena (e.g., sodium volatility), rather than thermodynamic stability of corresponding phases (19).

Contrary to Ba-based clathrates (20), high-pressure synthesis has not been explored so far for the Na—Si system. The remarkable negative values of atomic $\Delta V$ of clathrate formations (1.5-2.5 cm$^3$/mol; Table 1, below), compared with the elemental constituents, suggests that high pressure should facilitate their formation. High pressure (HP) synthesis is the most reliable method for elaboration and properties control of high-pressure phases, such as diamond (21, 22), cubic boron nitride (23, 24), and boron-rich compounds (25). The quasi-equilibrium growth of HP phases from solvents allows production of high-purity single crystals of a given habit and high-quality powders.

TABLE 1

Mean Atomic Volumes of Formation
$V_{at}°_f$ of sodium clathrates (cm$^3$/mol)

| Clathrate | $<V_{at}>^{clathrate}$ | $<V_{at}>^{Na+Si}$ | $\Delta V_{at}°_f$ |
|---|---|---|---|
| $Na_{24}Si_{136}$ | 12.03 | 13.81 | −1.78 |
| $Na_8Si_{46}$ | 11.83 | 13.79 | −1.96 |
| $NaSi_6$ | 11.35 | 13.72 | −2.37 |

This application discloses experimental and theoretical results that unambiguously indicate that Na clathrates are thermodynamically stable high-pressure phases. Stoichiometric sodium clathrates of structure I ($Na_8Si_{46}$) and a new metallic clathrate compound $Na_4Si_{24}$ were synthesized directly from the elements, allowing for new opportunities for melt-based growth under equilibrium conditions. Over the range of conditions studied, the $Na_{24}Si_{136}$ clathrate (sII) only forms as an intermediate compound prior to crystallization of the sI phase.

Figure 3A:
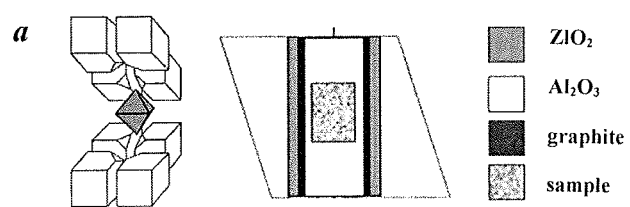
FIG. 3(a) shows double-stage multianvil assemblies (left) and a high pressure cell (right) used for synthesis.

Sodium clathrates were prepared from elemental Na/Si mixtures (20 mol % Na, i.e., 5% excess as compared with stoichiometric sI and sII clathrates). The initial mixture was ground for 1 hour in a porcelain mortar contained within a glovebox under a high-purity Ar atmosphere. The mixtures were loaded into double-walled capsules, the inner one from Ta and the outer one from Au (see FIG. 1). Such a simple design of the capsule allows one to keep the Na-rich liquid under high-pressure and high-temperature conditions for a long time (at least up to 12 hours) without hermetic sealing of the initial capsule. The capsules were then introduced into high-pressure cells: (1) octahedral-shaped assemblies for multianvil (18/11 type, pressures from 3 to 8 GPa, FIGS. 1 and 3a)(26) and (2) standard half-inch assemblies for piston-cylinder (pressures from 1 to 3 GPa), and compressed to the desired pressure. The time-pressure-temperature conditions of experiments are given in Table 2 (see below). In some cases, the heating was performed in two steps, i.e., 30 min at 675 K, and the remaining time (1.5-24 hours) at the final temperature. The main purpose of this preheating was to avoid the blow-out of overheated liquid sodium from the cell at the initial stages of synthesis, that is, before Na reacts with Si. After completion of this step, the temperature was decreased either by switching off the power or by slowly decreasing the power over a 10-60 min duration. The latter allowed for the study of crystallization in (quasi-) equilibrium conditions.

TABLE 2

Experimental conditions of High Pressure synthesis and phase composition of the resulting washed sample

| Run | Experimental conditions | Si | sI | SII | $Na_4Si_{24}$ | Ta or Au | $Ta_xSi_y$ |
|---|---|---|---|---|---|---|---|
| Quenching experiments ||||||||
| PL695 | 6 GPa, 675/1075 K 0.5/1.5 h | S | | M | | W | |
| PL702 | 6 GPa, 675/1075 K 0.5/3.5 h | S | M | M | | | |
| PL703 | 6 GPa, 675/1075 K 0.5/1.5 h | S | M | M | | | |
| PL704 | 3 GPa, 675/1075 K 0.5/11.5 h | | W | | | W | S |
| PL705a | 6 GPa, 675/975 K 0.5/3.5 h | S | | M | | | |
| Slow-cooling experiments ||||||||
| PL706 | 6 GPa, 675/1125 K 0.5/5.5 h | W | S | | | | |
| PL708 | 3 GPa, 675/975 K 0.5/5.5 h | W | S | | | | |
| PL713 | 8 GPa, 675/1075 K 0.5/5.5 h | W | | | S | | |
| SamiPC1 | 1 GPa, 1075 K 24 h | S | | | | M | |
| PC1015 | 2 GPa, 1125 K 6 h(33at % Na) | M | | | | W | |
| PC1028 | 1.2 GPa, 875 K 2 h(33at % Na) | M | | | | | |
| PC1037 | 2 GPa, 925 K, 2 h | S | M | M | | | |
| PC1047b | 2 GPa, 1025 K, 2 h | S | M | | | | |
| Direct transformations. ||||||||
| PC1047a | 2 GPa, 1025 K 2 h($Na_8Si_{46}$) | S | M | | | | |

* If not mentioned otherwise, the initial Na/Si mixtures contained 20 at % of Na.
†S (strong) - predominant phase, M (medium) - one of major phases, W (weak) - secondary phase/contamination.
‡ The format is: Preheating temperature (or time)/Heating temperature (or time).

Figure 2:
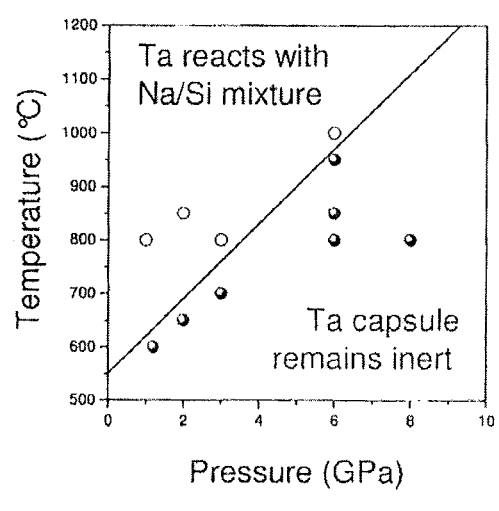
FIG. 2 is a p-T domain of applicability of Ta as capsule material.
Figure 3B:
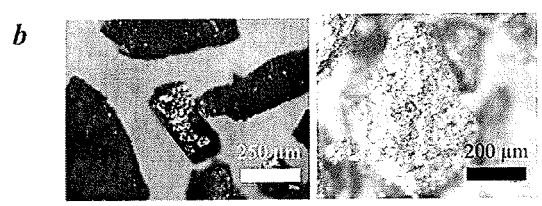
FIG. 3(b) provides photographic images of metallic $Na_8Si_{46}$ (left) and $Na_4Si_{24}$ (right) synthesized at high pressure.

As shown in FIG. 1, the recovered samples were easily removed from the Ta/Au capsules. No reaction between the Na/Si mixture and capsule was detected to 1275 K at 6 GPa and to 1000 K at 3 GPa (see FIG. 2). Recovered samples were washed in water, rinsed with ethanol, and dried in air. FIG. 3(b) shows typical pictures of recovered clathrate particles with metallic brilliance, similar to previous reports for stoichiometric clathrates (10).

Figure 4:
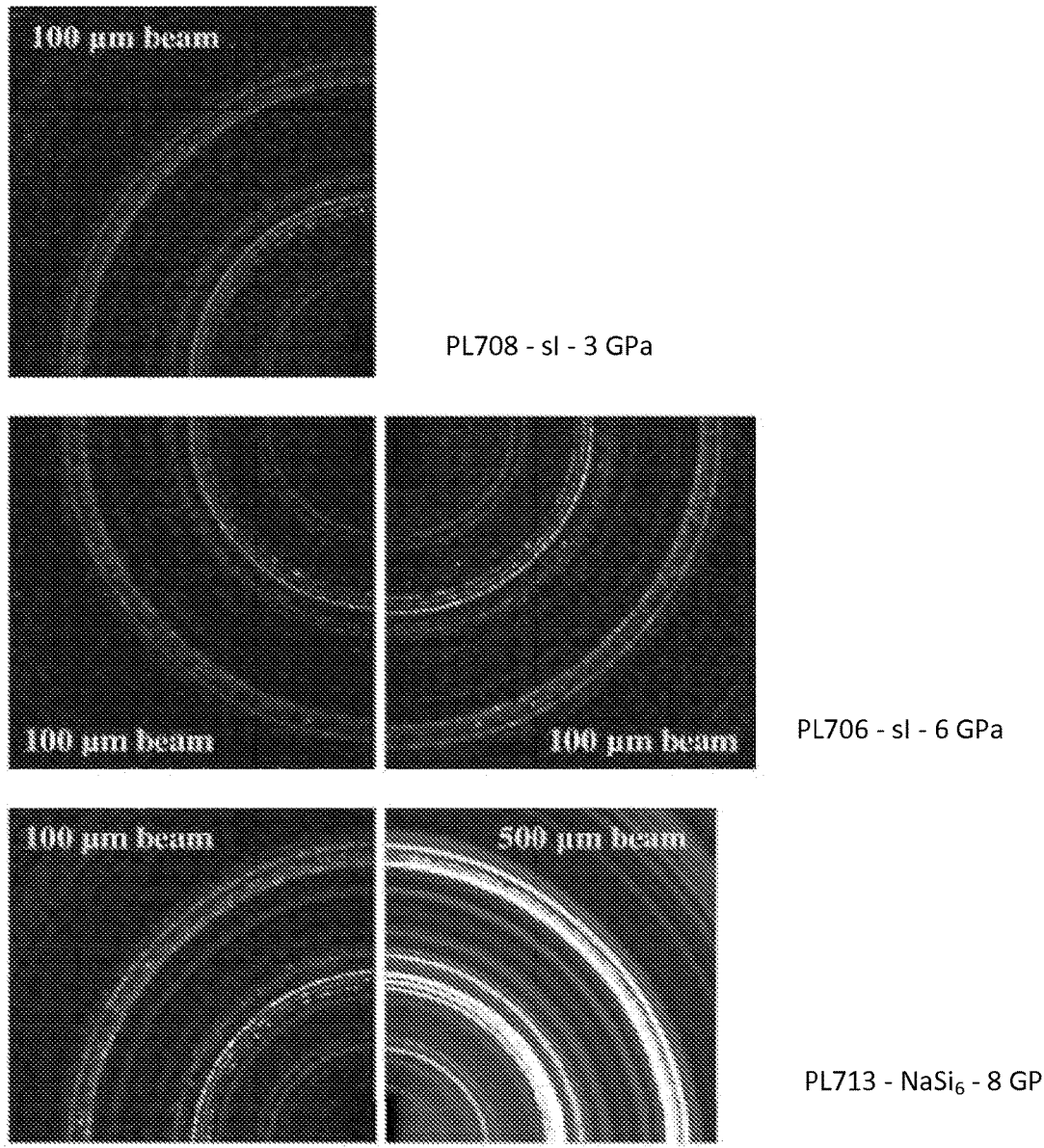
FIG. 4 provides dimensional X-ray diffraction data for pieces of $Na_8Si_{46}$ and $Na_4Si_{24}$.
Figure 5:
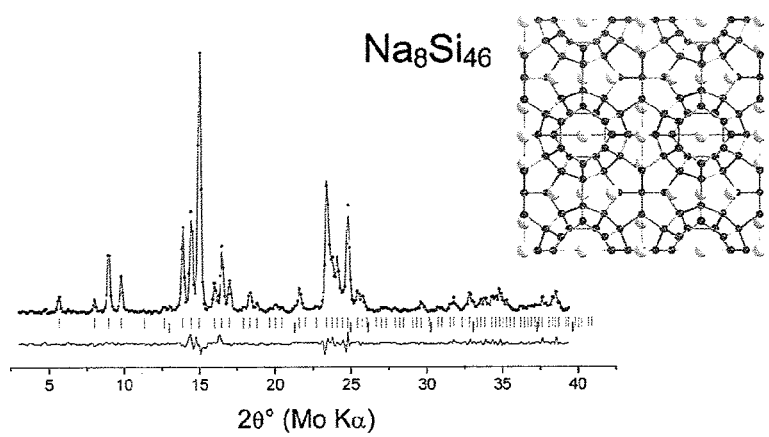
FIG. 5 provides Rietveld refinements of Powder X-ray diffraction (PXRD) patterns for $Na_8Si_{46}$ crystallized under slow cooling at 6 GPa. A corresponding structure is shown to the right with host silicon and guest sodium atoms.

Powder X-ray diffraction (PXRD) from samples recovered between 2 and 6 GPa revealed the formation of sI clathrate. The presence of a small amount of silicon in the recovered samples likely indicates the peritectic character of the Na—Si phase diagram under pressure, with the peritectic reaction $L_{Na/Si}+Si=Na_8Si_{46}$. Two dimensional X-Ray diffraction data indicated the presence of both primary grown clathrate crystals and fine-grained powder formed during eutectic crystallization (see FIG. 4). Individual polycrystalline pieces of pure sI clathrate were easily isolated (up to 500 μm in length, FIG. 3), and FIG. 5 shows the PXRD pattern of sI clathrate formed under quasi-equilibrium conditions at 6 GPa with a=10.208(1) Å. Correspondence between the experimental lattice constants and literature values (a=10.198 Å) (27), in addition to Rietveld refinements of site occupancies (Table S3, below), indicate that the recovered phase is approximately stoichiometric, that is, $Na_8Si_{46}$. The formation of sI clathrate directly from the elements indicates a region of high-pressure thermodynamic stability on the Na—Si binary phase diagram.

TABLE S3

Structural refinement data for $Na_8Si_{46}$ and $NaSi_6$.
Different fits for a given structure correspond either to the model of ideal stoichiometry (Fit 1) or to possible non-stoichiometry of Na positions (Fit 2). Both models provide comparable fits indicating near-ideal stoichiometry. A decrease in Na occupancy leads to a decrease in the fitted $U_{iso}$ value.

$Na_8Si_{46}$

Fit 1
$X^2 = 0.260 \cdot 10^{-2}$
wRp = 0.0449 (-Bknd)
Rp = 0.0305 (-Bknd)
Space group: Pm-3n (No 223)
Lattice parameter: a = 10.208(1)

Atomic coordinates

| | x | y | z | Occupancy | $U_{iso}$ |
|---|---|---|---|---|---|
| Si1 (6c) | 0.25 | 0.5 | 0 | 1 | 0.012(6) |
| Si2 (16i) | 0.184(1) | 0.184(1) | 0.184(1) | 1 | 0.012(6) |
| Si3 (24k) | 0 | 0.118(1) | 0.308(1) | 1 | 0.012(6) |
| Na4 (2a) | 0 | 0 | 0 | 1 | 0.042(30) |
| Na5 (6d) | 0.25 | 0 | 0.5 | 1 | 0.051(20) |

Fit 2
$X^2 = 0.257 \cdot 10^{-2}$
wRp = 0.0443 (-Bknd)
Rp = 0.0289 (-Bknd)
Space group: Pm-3n (No 223)
Lattice parameter: a = 10.208(1)

Atomic coordinates

| | x | y | z | Occupancy | $U_{iso}$ |
|---|---|---|---|---|---|
| Si1 (6c) | 0.25 | 0.5 | 0 | 1 | 0.012(6) |
| Si2 (16i) | 0.184(1) | 0.184(1) | 0.184(1) | 1 | 0.012(6) |
| Si3 (24k) | 0 | 0.118(1) | 0.308(1) | 1 | 0.012(6) |
| Na4 (2a) | 0 | 0 | 0 | 1.0(1) | 0.043(30) |
| Na5 (6d) | 0.25 | 0 | 0.5 | 0.95(6) | 0.032(30) |

$NaSi_6$

Fit 1
$X^2 = 0.866 \cdot 10^{-2}$
wRp = 0.0322 (-Bknd)
Rp = 0.0500 (-Bknd)
Space group: Cmcm (No 63)
Lattice parameters: a = 4.106(3), b = 10.563(9), c = 12.243(9)

Atomic coordinates

| | x | y | z | Occupancy | $U_{iso}$ |
|---|---|---|---|---|---|
| Na1 (4c) | 0 | 0.285(5) | 0.25 | 1 | 0.061(20) |
| Si2 (8f) | 0 | 0.245(3) | 0.549(1) | 1 | 0.017(6) |
| Si3 (8f) | 0 | 0.566(2) | 0.347(1) | 1 | 0.017(6) |
| Si4 (8f) | 0 | 0.027(2) | 0.594(1) | 1 | 0.017(6) |

TABLE S3-continued

Structural refinement data for $Na_8Si_{46}$ and $NaSi_6$.
Different fits for a given structure correspond either to the model of ideal stoichiometry (Fit 1) or to possible non-stoichiometry of Na positions (Fit 2). Both models provide comparable fits indicating near-ideal stoichiometry. A decrease in Na occupancy leads to a decrease in the fitted $U_{iso}$ value.

Fit 2
$X^2 = 0.845 \cdot 10^{-2}$
wRp = 0.0327 (-Bknd)
Rp = 0.0508 (-Bknd)
Space group: Cmcm (No 63)
Lattice parameters: a = 4.106(3), b = 10.563(9), c = 12.243(9)

Atomic coordinates

| | x | y | z | Occupancy | $U_{iso}$ |
|---|---|---|---|---|---|
| Na1 (4c) | 0 | 0.284(4) | 0.25 | 0.93(6) | 0.043(30) |
| Si2 (8f) | 0 | 0.245(3) | 0.549(1) | 1 | 0.018(6) |
| Si3 (8f) | 0 | 0.565(2) | 0.346(2) | 1 | 0.018(6) |
| Si4 (8f) | 0 | 0.028(2) | 0.594(1) | 1 | 0.018(6) |

Figure 6A:
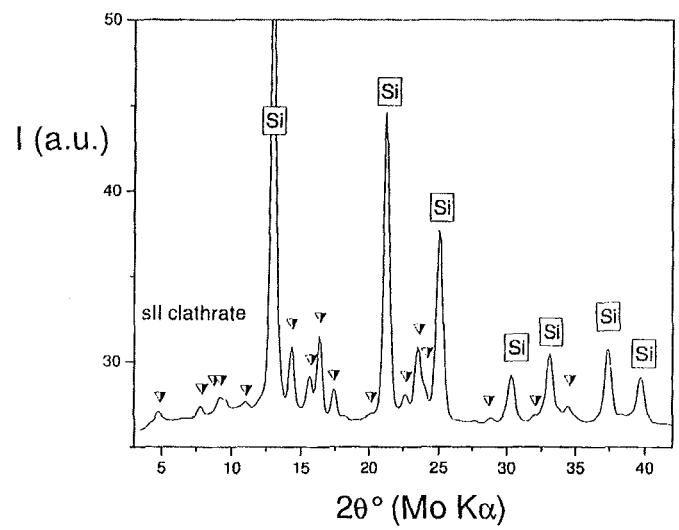
FIG. 6(a) provides a Powder X-Ray diffraction pattern of the sII/d-si samples obtained in quenching experiments at 6 GPa and 700 C (PL 705a). The weak amorphous halo at ~10° (2θ) arises from the borosilicate glass capillary.
Figure 6B:
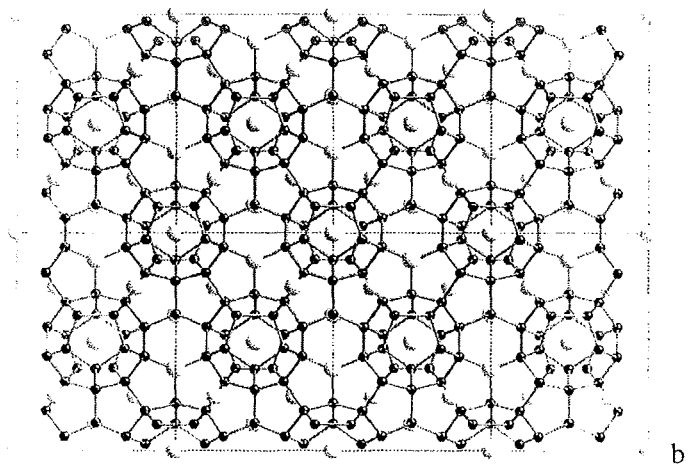
FIG. 6(b) provides a crystal structure of Na—Si sII clathrate.

While sI was always observed between 2 and 6 GPa under quasi-equilibrium conditions of slow cooling (2-10 K·min-1), the rapid quench of the system to ambient temperature (by abruptly switching off the heating power) led to the recovery of both sI and sII phases. Fast and/or lower temperature treatment of the reacting mixture may also occasionally lead to a combination of sII and diamond-Si, without remarkable traces of sI clathrate (see FIGS. 6(a) and 6(b)). According to X-ray diffraction data, the lattice parameter of this sII clathrate (a=14.76(2) Å) is expanded by 0.3% as compared to that of stoichiometric sII obtained by thermal decomposition under vacuum (a=14.72 Å) (28). Evidently, sII is not thermodynamically stable between 2 and 6 GPa over the temperature range studied, but its formation may be induced under transient recrystallization conditions. This result might be explained in terms of Ostwald's rule of stages (i.e., easier nucleation of a less stable phase in terms of chemical potential, prior to the stable phase formation), due to structural similarity and close Gibbs energies. A similar HP effect was recently observed in other cage-based crystal structures of elemental boron (29).

Figure 7:
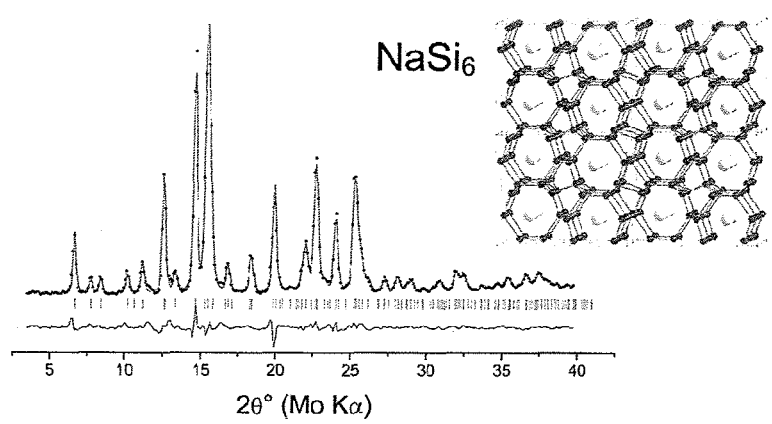
FIG. 7 provides a Rietveld refinement of PXRD patterns for $Na_4Si_{24}$ crystallized under slow cooling at 8 GPa. A corresponding structure is shown to the right with host silicon and guest sodium atoms.
Figure 8A:
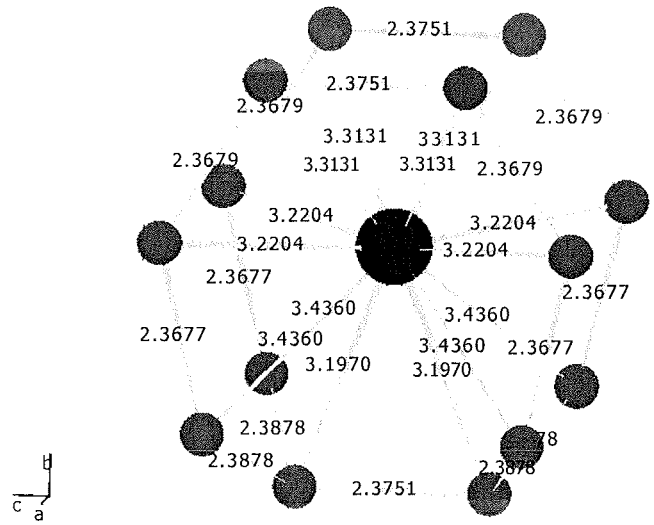
FIGS. 8(a) and 8(b) provide structural fragments of $Na_4Si_{24}$.
Figure 8B:
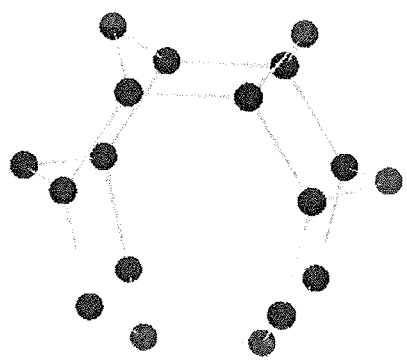

When the pressure was increased to 8 GPa, the formation of a novel Na—Si compound, $Na_4Si_{24}$, was observed. As shown in FIG. 7, it has the $Eu_4Ga_8Ge_{16}$(30) structural type, never reported thus far for an alkali metal. The structure is composed of $sp^a$-bonded Si atoms, which form tunnels, intercalating Na atoms along the a axis. The Na~Na distance of 4.106(1) Å is the shortest metal-metal distance for this structural family (e.g., Ba~Ba distance in isostructural $BaSi_{24}$ is 4.479 Å), but quite reasonable given the small diameter for Na. The Si—Si distances vary from 2.368 to 2.380 Å, very close to those of sI clathrate $Na_8Si_{46}$ (2.333-2.413 Å), and shorter than those in $BaSi_{24}$ (2.400-2.469 Å). The Si—Si—Si angles vary in a wide range between 99.2 and 134.0°, similar to those in $BaSi_{24}$(97.8-136.4°, and are remarkably less uniform than those in cubic sI $Na_8Si_{46)}$ (106.1-124.1°. As shown in FIG. 8(a), each sodium atom has 14 nearest Si atoms (3.197-3.436 Å) and 2 Na atoms along the a axis. Contrary to sI and sII clathrate structures, where Si atoms form cages produced by only slightly distorted pentagonal and hexagonal rings, the Si matrix of $Na_4Si_{24}$ is produced by hexagonal rings with well-pronounced boat and chair configurations (see FIG. 8(b)).

As compared to $Ba_4Si_{24}$(31), $Sr_4Si_{24}$(32) and $Ca_4Si_{24}$ (33), the corresponding sodium compound forms at substantially lower pressure: 8 GPa as compared to 11.5 and 10 GPa for $BaSi_{24}$ and $CaSi_{24}$, respectively. The pressure for $Na_4Si_{24}$ formation allows consideration of this phase for a large-volume production, for example, in the toroid-type high-pressure systems, (34) contrary to the alkali-earth metal analogues.

Figure 9:
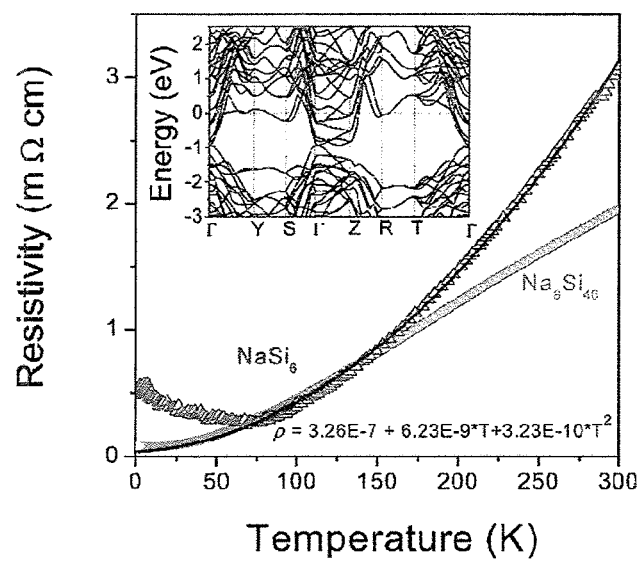
FIG. 9 provides a graph showing electrical resistivity of $Na_4Si_{24}$ and $Na_8Si_{46}$ crystallized at 3 GPa as a function of temperature. The graph also provides a quadratic fit of $Na_4Si_{24}$ resistivity data (above 75 K). The inset shows the calculated band structure of $Na_4Si_{24}$ at 1 MPa.

The electrical resistivity of a polycrystalline piece of 500×500 µm² of $Na_4Si_{24}$ was measured as a function of temperature by the standard four-electrode technique, using a Physical Property Measurement System (PPMS: Quantum Design, Inc.). Overall, $Na_4Si_{24}$ exhibits metallic behavior, with the electrical resistivity decreasing with decreasing temperature (see FIG. 9). Below 75 K, the electrical resistivity begins to increase with further temperature decreases, a feature never observed so far for related compounds within this structural family. The residual resistivity ratio value (RRR, defined here as ratio between $\rho_{300K}$ and a minimal value of $\rho$, $\rho_{min}$) is between 13 and 100 depending on the estimate of $\rho_{min}$, which can be taken at 75 K (for the lower estimate of RRR) or taken at 0 K by extrapolating a least-squares fit of the high-temperature part of the T-$\rho$ curve (FIG. 9). Contrary to $Na_4Si_{24}$, the resistivity of sI obtained at 3 GPa shows monotonic behavior with temperature (FIG. 9), but the RRR value is also very high, 24. Typical RRR values for clathrates obtained without pressure are between 1 and 6, even for single crystals (35) (the best value of 36 was recently achieved (36) for a single crystal of $Na_8Si_{46}$ obtained by the so-called "slow controlled removal of Na" method) (37). In fact, high-pressure synthesis provides samples with remarkably improved electrical properties, even in the case of bulk material. Until now, such an improvement was unachievable by nonequilibrium crystal growth methods.

The observed minimum at about 75 K on the resistivity curve for $Na_4Si_{24}$ might be caused by the particularities of the electronic band structure and by an unknown scattering process. The present results suggest that the resistivity increase in $Na_4Si_{24}$ at very low temperatures (formal value of $\rho_{300K}\rho_{2K}$ for $Na_4Si_{24}$ is 6) is not due to structural defects, intergrain boundaries, or an experimental artifact (the low-temperature resistivity curve of sI does not show such behavior, FIG. 9).

While the formation of sI clathrate and $Na_4Si_{24}$ directly from the elements indicates high-pressure thermodynamic stability of these phases, the inventors performed density functional theory (DFT) calculations (38) in order to further elucidate the nature of their stability. Geometry optimizations were performed within the framework of the generalized gradient approximation (GGA) with the Perdew-Burke-Ernzerhof (PBE) parametrization (39) for the exchange-correlation functional implemented in Quantum Espresso. For Brillouin zone integration, the inventors used the Monkhorst-Pack scheme (40) and checked convergence of ground-state calculations with uniformly increasing k-point meshes for each structure. The inventors used a plane-wave basis set cutoff of 60 Ry and generated a 8×8×8 k-point grid meshed for a Brillouin zone integration (41). Calculations of phonons of $Na_4Si_{24}$ were performed with density functional perturbation theory with a uniform 4×4×4 mesh.

Figure 10:
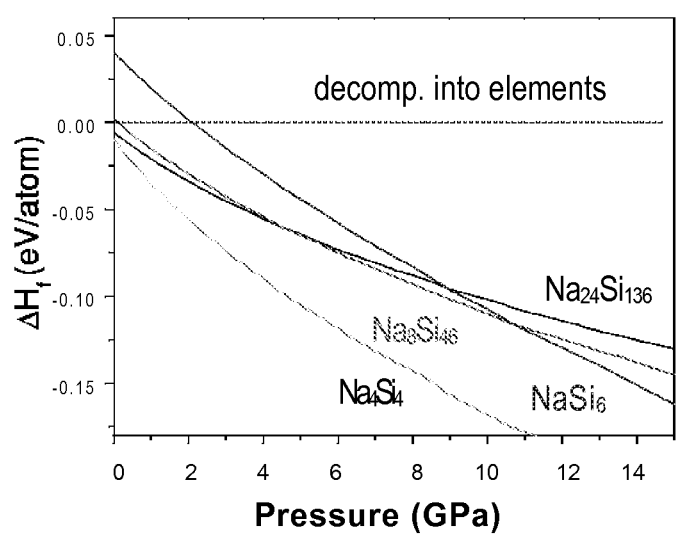
FIG. 10 provides a graph showing the calculated $\Delta H_f$ of formation ($Na_xSi_y$=yd-Si+x Na) for various Na—Si compounds at OK and pressures up to 15 GPa.
Figure 11:
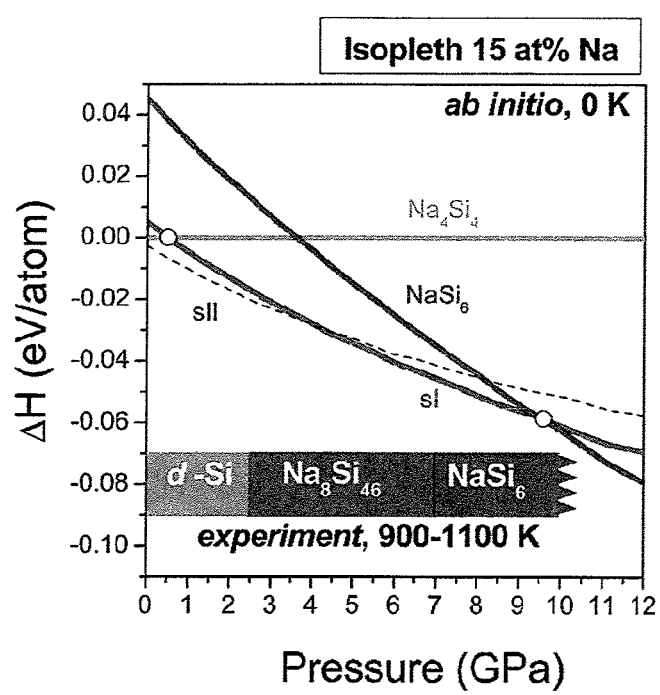
FIG. 11 provides a graph showing calculated enthalpies of clathrate phases relative to the $Na_4Si_4$—Si system (15 at. % Na) as a function of pressure at OK (lines). Shaded boxes at the bottom show the experimental pressures of d-Si, sI and $Na_4Si_{24}$ crystal formation at high temperatures from Na—Si melt.

Density functional theory (DFT) calculations reveal that $Na_4Si_4$, sI, sII, and $Na_4Si_{24}$ are all stable against decomposition into the elements at high-pressure conditions (see FIG. 10). FIG. 10 shows the calculated enthalpy differences, $\Delta H$, between the clathrate structures and a mixture of d-Si and $Na_4Si_4$ Zintl phase, which are the experimentally observed thermodynamically stable phases at ambient conditions (18). To compare the thermodynamic stability, the total composition has been fixed to 15 at. %; that is, the inventors compared the systems $NaSi_{5.667}$ for structure II, ($NaSi_{5.75-0.083}$ Si) for structure I, and ($Na_4Si_{24}$-0.333 Si) for $Na_4Si_{24}$. As shown in FIG. 11, these results indicate that both sI and $Na_4Si_{24}$ are indeed thermodynamically stabilized by high-pressure conditions: sI and $Na_4Si_{24}$ become the most enthalpically favorable structures at approximately 4 and 9.5 GPa, respectively. From the experimental high pressure, high temperature (HPHT) data, the corresponding values of pressure are 2.5(5) GPa for sI and 7(1) GPa for $Na_4Si_{24}$ at 900-1100 K, demonstrating very good qualitative agreement between predicted and experimental domains of stability.

Density functional theory calculations suggest that sII clathrate is the stable ground state from 0 to 4 GPa, yet experiments performed below 2 GPa resulted in the recrystallization of Si. At ambient pressure, the inventors calculate sII to be more stable than $Na_4Si_4$+Si by 2.5 meV/atom, whereas sII is more stable than "sI-Si" by 5.2 meV/atom. At 4.2 GPa, the inventors calculate sI to become more stable than sII. The absence of sII in quasi-equilibrium experiments and the lack of this clathrate phase on the ambient-pressure binary Na—Si phase diagram are in apparent disagreement with our calculations; however, enthalpy differences between these compounds are small. Finite temperature effects and kinetic barriers across the various phases may contribute to the differences observed. Nevertheless, the observation of sII in rapid-quench experiments certainly verifies the seemingly isoenthalpic nature of these phases.

The results open new perspectives for high-pressure synthesis and properties control of new advanced materials. The high-pressure thermodynamic stability of Na—Si clathrate phases allows for a melt-based synthesis approach, which could be very useful for compositional control in mixed phases (e.g., Na+Ba, etc.), high-quality single crystals, and for precise tuning of the occupancy ratios. All phases formed in this pressure domain allow for larger-volume scaling of materials (from 40 cm³ for cubic sI at 3 GPa to 1 cm³ for the orthorhombic $Eu_4Ga_8Ge_{16}$ structure at 8 GPa). The consistency of experimental results with ab initio calculations may justify the future application of this approach to the prediction of new covalent $sp^a$ intercalation compounds (e.g., carbon-rich compounds). Finally, the results reveal the existence of multiple chemical mechanisms that allow for synthesis of high-pressure phases "without pressure." Since the Na—Si clathrates are stable only under high-pressure conditions (>2 GPa), previous reports of their synthesis may be viewed as nonequilibrium, precursor-based routes to high-pressure phases at low-pressure conditions. The understanding of such intrinsic interrelationships between thermodynamics and kinetics is thus the next step to explore that could open the potential for other precursor-based syntheses of high-pressure phases.

In addition to their innovations discussed above, the inventors have unexpectedly discovered that the new compound $Na_4Si_{24}$ is an excellent precursor in the production of another new compound $Si_{24}$.

In one embodiment of the invention, the $Na_4Si_{24}$ compound may be subjected to dynamic vacuum conditions at modest temperatures to remove the sodium atoms and produce a sodium-free version of the compound: $Si_{24}$ (also named oC24 silicon or Cmcm-24 silicon).

$Si_{24}$, never before discovered or described in a publication, has an orthorhombic structure. The lattice constants are as follows: a=3.83 Å, b=10.69 Å and c=12.63 Å. This material is semi-conducting with an indirect band gap of 1.30 eV and a direct band gap of 1.34 eV. $Si_{24}$ is a significantly better absorber of sunlight than d-Si.

The $Si_{24}$ structure of silicon is produced by treating the $Na_4Si_{24}$ precursor under vacuum conditions (~$1\times10^{-2}$ torr) at elevated temperature (~130° C.) for a preferred period of several days. At conditions of only 80° C. and no vacuum (ambient pressure), sodium atoms start to leave the $Na_4Si_{24}$ structure. At $1\times10^{-5}$ torr and 130° C. for 4 days, no sodium is detectable by energy dispersive spectroscopy measurements (EDS).

Figure 12:
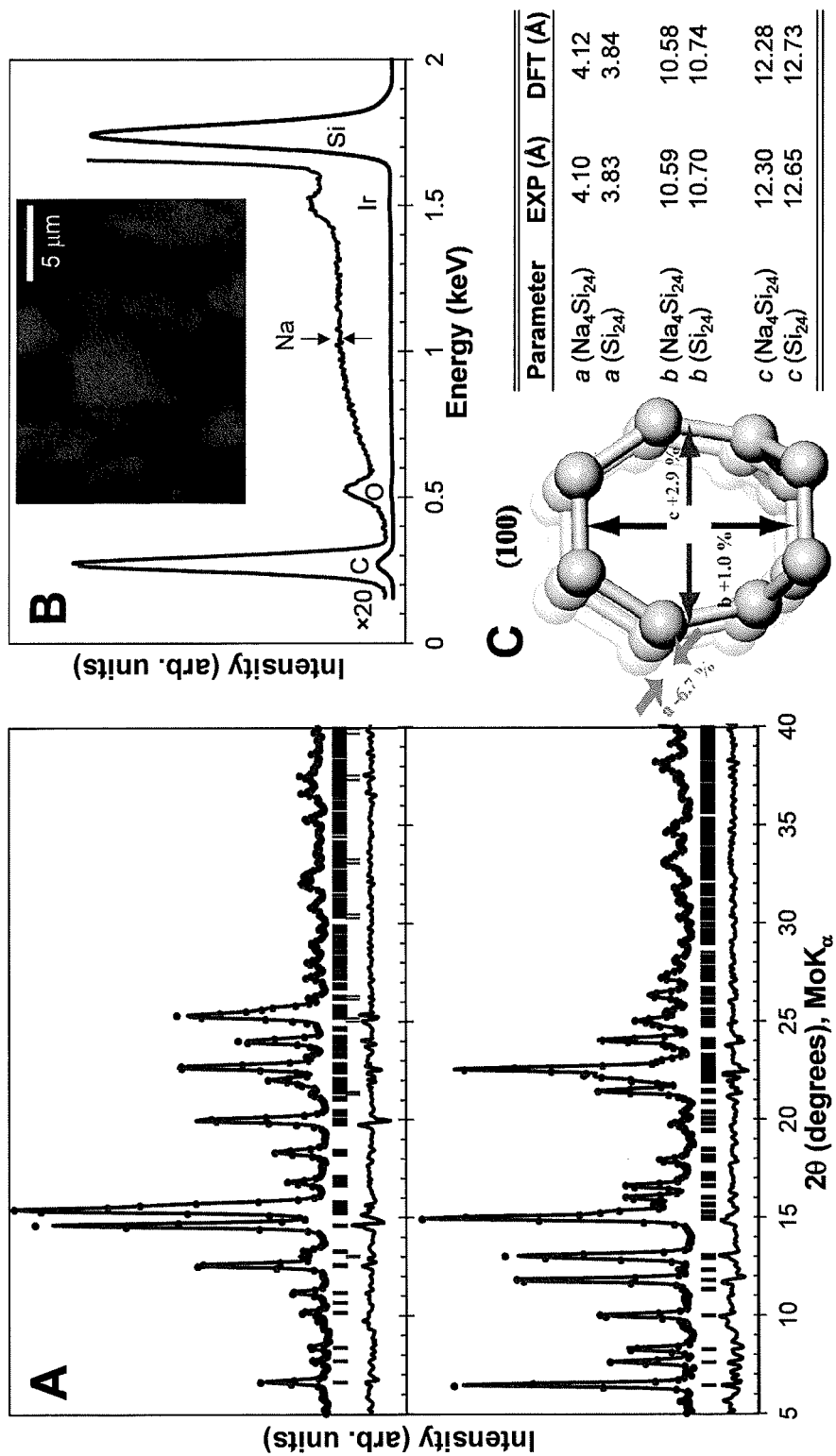
FIG. 12 provides structure determination and composition information for $Si_{24}$.

As shown in FIG. 12A, reduced sodium content in the structure was verified by x-ray diffraction. The top pattern in FIG. 12A shows the x-ray diffraction of $Na_4Si_{24}$ and provides the lattice constants previously outlined—i.e., a=4.106, b=10.563, c=12.243 with a sodium occupancy of 1.0. The bottom pattern in FIG. 12A shows the sodium-free version, $Si_{24}$, with lattice constants a=3.83, b=10.69, c=12.63 and Na occupancy of 0.0.

The sodium content was also verified by using energy dispersive spectroscopy (EDS) on a scanning electron microscope (SEM).

Figure 13:
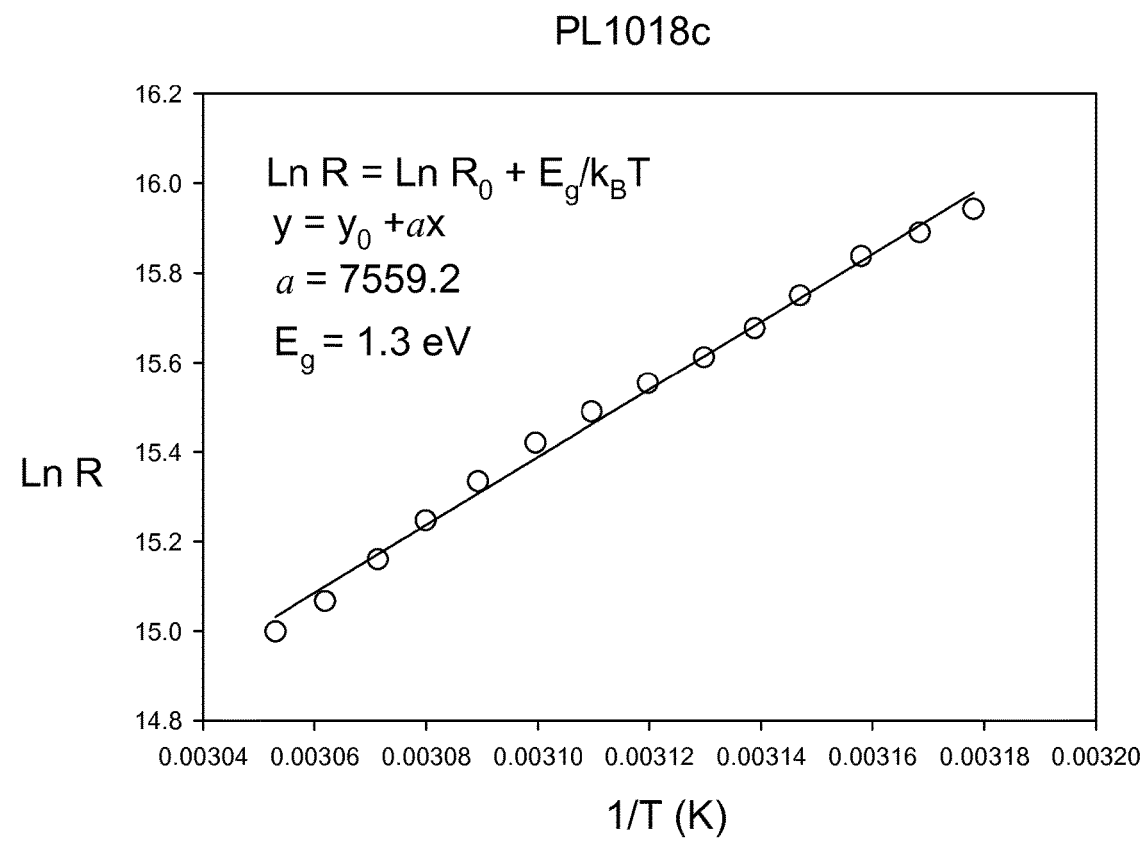
FIG. 13 shows a plot of electrical resistance as a function of temperature for $Si_{24}$ an dis fit to extract a band gap of 1.3 eV.

FIG. 13 shows the electrical resistance as a function of temperature (1/T) and is fit to extract a band gap of 1.3 eV.

Density functional theory calculations were performed to confirm the stability of the $Si_{24}$ structure and to further investigate the electronic band structure.

Figure 14:
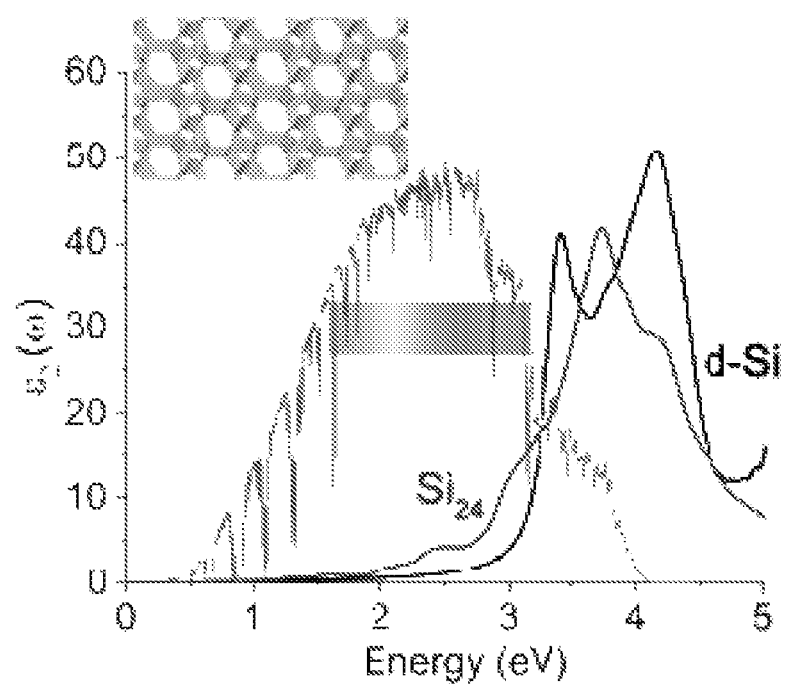
FIG. 14 provides the absorption (imaginary portion of the dielectric constant) for $Si_{24}$ compared with "normal" diamond phase silicon. Enhanced light absorption was observed compared with normal silicon.

The light absorption of $Si_{24}$ relevant to solar applications was also calculated. FIG. 14 shows the absorption (imaginary portion of the dielectric constant) for $Si_{24}$ compared with "normal" diamond phase silicon. Enhanced light absorption was observed compared with normal silicon.

The studies discussed herein have been motivated by the potential to find new silicon allotropes with advanced optical and electronic properties beyond those of d-Si [B4, B8, B16-B18]. In particular, photovoltaic applications ideally require a direct band gap of ~1.3 eV [B6], which has not been achieved by any existing silicon phase. Theoretically, low-energy silicon allotrope candidates were suggested that exhibit greatly improved visible light absorption characteristics with quasidirect band gaps (nearly degenerate indirect and direct gaps) [B4, B8]; however, no experimental synthesis was reported thus far. Of the known metastable Si allotropes, the BC8 structure is likely semi-metallic [B17] and the R8 structure was calculated to possess a small indirect gap of 0.24 eV [B16]. Lonsdaleite silicon, produced by heating the BC8 structure above 470 K, has an indirect gap of ~1 eV [B16, B17] and the crystal structure of alto-Si is not clearly resolved [B19]. Type-II silicon clathrate, $Si_{136}$, possesses a wide band-gap of 1.9 eV [B18], which is not suitable for photovoltaic applications. In addition, symmetry analysis of the cubic $Si_{136}$ structure shows that electric dipole transitions associated with this gap are forbidden [B20].

Figure 15:
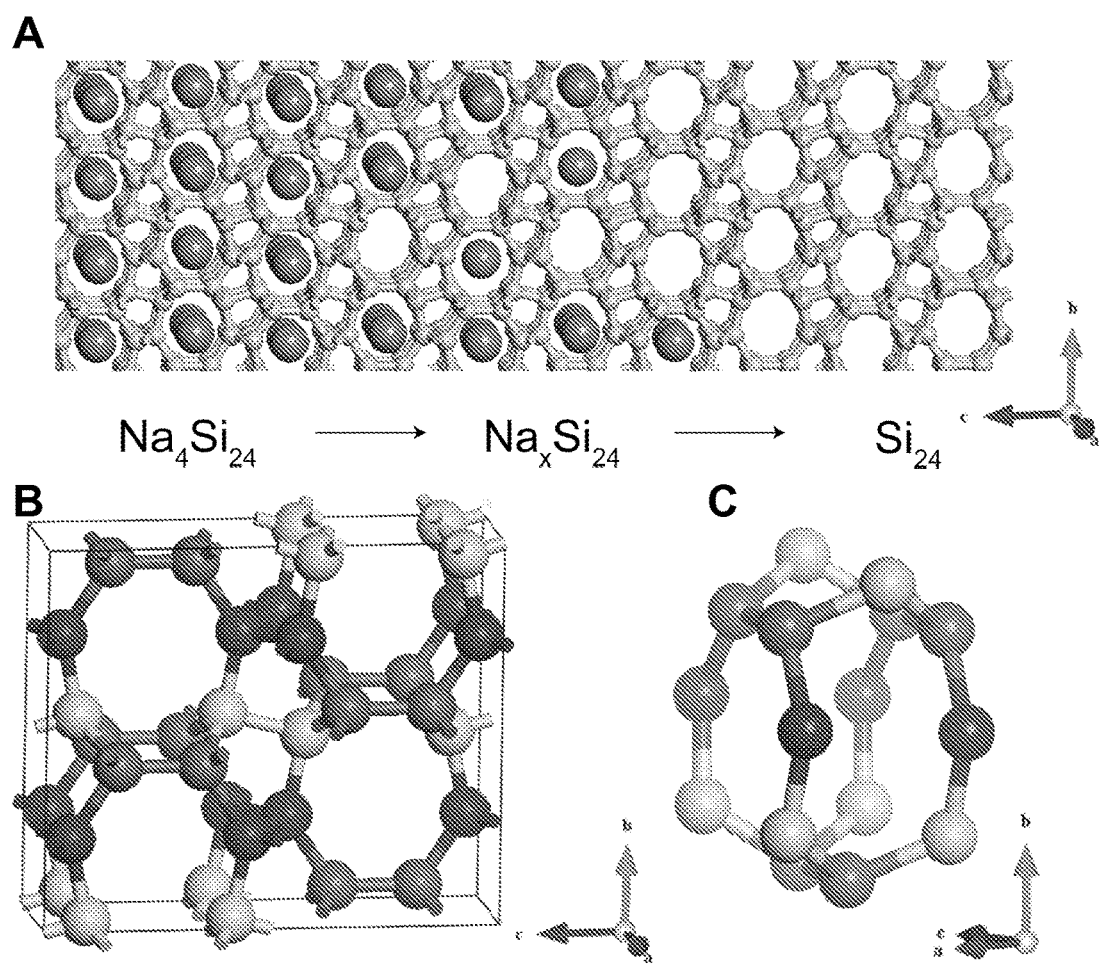
FIG. 15 provides crystal structures of $Na_4Si_{24}$ and $Si_{24}$.

Silicon-rich compounds may be considered as another route for synthesizing novel classes of silicon allotropes. This approach was used previously for the synthesis of type II silicon clathrate [B13] and germanium clathrate [B19], both of which utilize chemical precursors that are formed at ambient pressure. In this discovery, applicants considered using compounds recovered from high-pressure conditions as chemical precursors, rather than using compounds formed at ambient pressure. In this case, the synthesis of entirely new, previously inaccessible phases become possible by performing ambient-pressure chemical manipulations on inherently metastable materials recovered from high pressure. Applicants disclose herein the formation of $Na_4Si_{24}$ above ~8 GPa, and the concomitant metastable recovery of this phase to ambient conditions [B5]. This compound consists of a channel-like $sp^3$ silicon host structure filled with linear Na chains as a guest structure. These open channels that host Na suggest a possible pathway for Na removal via diffusion along the channels as schematically shown in FIG. 15A.

By exposing recovered $Na_4Si_{24}$ samples to elevated temperatures, removal of Na from the structure was observed. This process occurs at temperatures as low as 320 K, while type-II silicon clathrates ($Na_xSi_{136}$) require much higher temperatures (>623 K) for Na removal [B13, B21]. Thermal "degassing" of $Na_4Si_{24}$ at 400 K under dynamic vacuum resulted in a gradual reduction of the Na content and Na was completely removed from structure over a period of eight days. FIG. 12A shows powder X-ray diffraction (PXRD) patterns obtained from $Na_4Si_{24}$ and from a sample recovered after the thermal "degassing" process. After the eight-day period the host structure remains unchanged (Cmcm); however, the lattice constants and PXRD peak intensities are significantly different. The best Rietveld fits were obtained when sodium was excluded from the refinement (including Na led to unphysical negative occupancies and thermal parameters), indicating that the sodium concentration is below the detectable limits using PXRD. Excellent agreement between the experimental and calculated lattice constants, for both full and empty structures, provides additional evidence for the formation of the Na-free $Si_{24}$ structure (FIG. 12C). By removing Na, the a, b, and c lattice parameters change by −6.7%, +1.0%, and +2.9%, respectively, which indicates that the void channel diameters become larger and the length along the channels is reduced upon Na removal. In addition, the computed Raman spectrum for the Na-free $Si_{24}$ structure is in excellent agreement with experiment, corroborating the absence of Na from the $Si_{24}$ structure (discussed in more detail below).

The absence of sodium was also demonstrated using energy-dispersive X-ray spectroscopy (EDXS). EDXS measurements were performed on "degassed" samples of $Na_xSi_{24}$ ($0 \leq x \leq 4$) (FIG. 12B). No sodium was detected in the EDXS spectrum for completely degassed samples, indicating that the sodium content is below the detection limit of the instrument (<0.1 atom %). Thus, the new phase is at least 99.9% pure silicon and may be considered as a new allotrope: $Si_{24}$ (oC24).

$Si_{24}$ possesses an orthorhombic structure (Cmcm, space group 63) with lattice parameters a=3.825(1) Å, b=10.700 (2) Å, and c=12.648(2) Å. There are three non-equivalent Si positions (discussed in more detail below) and each Si atom is connected tetrahedrally with bond lengths ranging from 2.33 to 2.41 Å, as compared with the bond length of d-Si (2.35 Å). Along the a-axis, $Si_{24}$ possesses octagonal linear channels, which were occupied by Na in $Na_4Si_{24}$. To maintain the void space, the bond angles are distorted in a range from 93.7-135.9°, deviated from the perfect tetrahedral angle (109.5°). The low density of $Si_{24}$ (2.16 g/cc), due to its high nanoporosity, is between that of d-Si (2.33 g/cc) and $Si_{136}$ clathrate (2.15 g/cc).

The thermodynamic and dynamic stability of the new silicon phase was investigated using first principles calculations. Total energy calculations using density functional theory (DFT) show that $Si_{24}$ possesses a higher enthalpy than d-Si by 0.09 eV/atom and is energetically more favorable than other known metastable BC8 and R8 phases [B4]. Phonon dispersion relations for $Si_{24}$, obtained from lattice dynamics calculations (Supplementary Information, see below), indicate that this structure is dynamically stable at both high- and low-pressure conditions. This fact demonstrates that the removal of sodium atoms from $Na_4Si_{24}$ does not affect the lattice stability of the Si framework. At ambient pressure, the $Si_{24}$ lattice maintains dynamic stability, which is consistent with our experimental observations at ambient conditions. In our calculations, $Si_{24}$ is destabilized above 10 GPa and we speculate that it might transform to the metallic Si-II (β-tin) structure, similar to type-II Si clathrate, above 12 GPa [B22].

Figure 16:
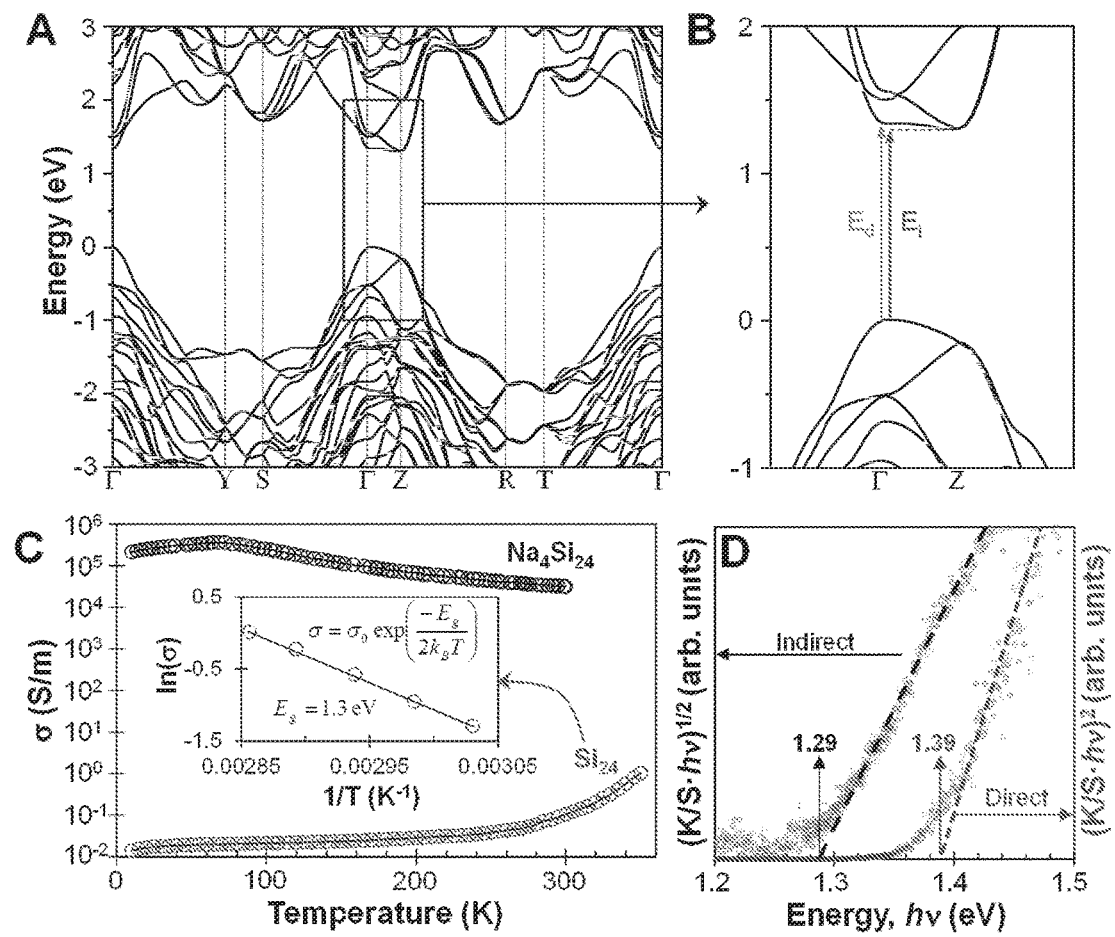
FIG. 16 provides electronic and optical properties of $Si_{24}$.

To gain further insight into the properties of $Si_{24}$, the electronic band structure was calculated. Using DFT, $Si_{24}$ was calculated to have a direct band gap ($E_d$) of 0.57 eV and an indirect band gap ($E_i$) 0.53 eV (Supplementary Information, see below). The difference between $E_d$ and $E_i$ is small, albeit formally an indirect band gap material. The highest valence and the lowest conduction bands are very flat in the 1-Z direction, indicating a quasidirect gap nature for $Si_{24}$. It is a well-known limitation of standard DFT to underestimate the band gap of silicon. Therefore, we used quasiparticle ($G_0W_0$) calculations for accurate band gap estimations. Under this approach, we successfully reproduced the indirect gap value of 1.12 eV for d-Si (1.17 eV from experiment) and found that the $G_0W_0$ corrected $E_d$ and $E_i$ for $Si_{24}$ are 1.34 eV and 1.30 eV, respectively (FIG. 16A, 16B). It is worth noting that the indirect gap nature of $Si_{24}$ can be easily tuned to a formally direct gap material by uniaxial compression. As the conduction band minimum is located at the Z point and the valence band maximum is at the f point, our calculations show that a two percent lattice compression along the c-axis induces an indirect-to-direct gap transition (Supplementary Information, see below).

The temperature dependence of the electrical conductivity σ, for $Si_{24}$, is shown in FIG. 16C. $Si_{24}$ exhibits semiconducting behavior where σ increases with increasing T. This is in contrast with the temperature dependence of σ for $Na_4Si_{24}$ [B5], which is metallic due to the excess charge carriers associated with Na. The rigid-band model, applicable to other guest-host compounds [B23], can be also applied to $Na_xSi_{24}$ (0≤x≤4). According to this model, the electropositive Na donates its valence electrons to the conduction bands of the Si framework. $Si_{24}$, as compared to $Na_4Si_{24}$, has no available conduction charge carriers and therefore exhibits semiconducting behavior (FIG. 16C). Using DFT, we calculated the electronic structure of $Na_xSi_{24}$ down to x=0.125 (~0.5 atom %) and found that this small Na content is enough to maintain the metallic nature of the compound (Supplementary Information, see below). Thus, a metal-to-semiconductor transition is observed when sodium is completely removed from the structure. A band gap of 1.3 eV was calculated for $Si_{24}$ from the intrinsic region of the electrical conductivity (FIG. 16C), which is in excellent agreement with our $G_0W_0$ calculations.

Optical reflectivity measurements were performed on samples of $Si_{24}$ in order to obtain absorption information from the powder samples and to further evaluate the band gap. FIG. 16D shows Tauc plots [B24] of the Kubelka-Munk absorption (K/S) with the data scaled for both indirect and direct transitions. If a plot of $(K/S \cdot h\nu)^{1/2}$ versus hν yields a straight line, $E_i$ can be estimated by extrapolating this line to K/S=0. Similarly, $E_g$ is estimated from a plot of $(K/S \cdot h\nu)^2$ versus hν. Under this approach, absorption edges for $Si_{24}$ were observed at 1.29 eV and 1.39 eV, assuming indirect and direct transitions, respectively. While single crystal or thin film samples should be measured for a more strict discussion of the band gap, the observed absorption edges are in excellent agreement with the energy gaps determined from electrical conductivity measurements and from theoretical estimates using first principles calculations (Supplementary Information, see below). These various methods constrain the band gap of $Si_{24}$ near 1.3 eV and indicate only minor separation between the direct and indirect values: 0.04 eV from the $G_0W_0$ calculation, ~0.1 eV from experiment.

Figure 17:
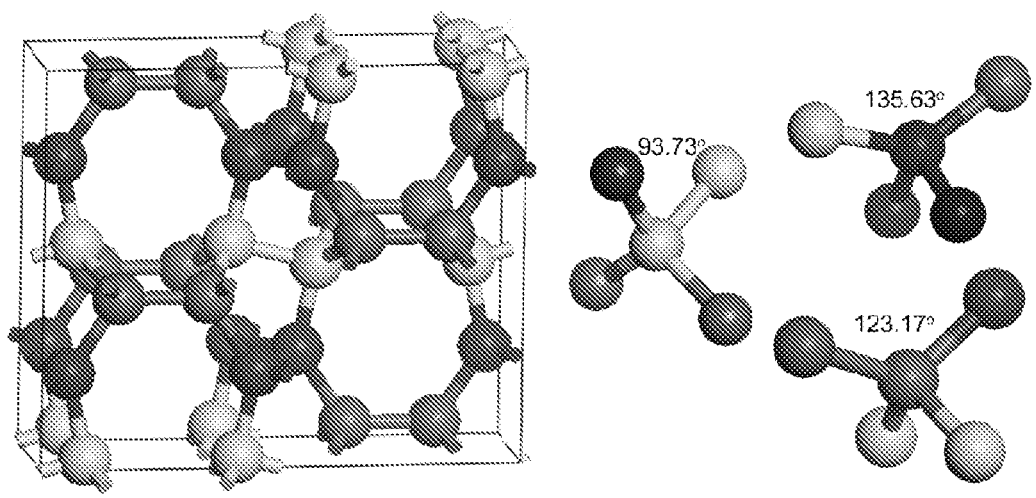
FIG. 17 depicts a unit cell of $Si_{24}$ and unique silicon atoms. Three different atomic positions of Si are represented with different colors. Crystal fragments are shown on the right side with the most deviated angle from the perfect tetrahedral angle (109.5°). Angles are from DFT optimization.

To check for potential improvements in light absorption properties, we calculated absorption spectra of $Si_{24}$ as shown in FIG. 17, compared with d-Si, by solving the Bethe-Salpeter Equation (BSE) [B25, B26]. The absorption of these two phases is compared with the reference air mass (AM) 1.5 solar spectral irradiance [B27]. Compared with d-Si, the light absorption of $Si_{24}$ is significantly enhanced below 3 eV, particularly in the visible light range where solar spectral irradiation has its maximum intensity. While the electric dipole transitions at the band gap of $Si_{136}$ are forbidden by symmetry [B20], optical absorption in $Si_{24}$ starting from the absorption edge is dipole allowed. It is interesting to note that the calculated absorption intensity of $Si_{24}$ is quantitatively comparable to that of ternary chalcopyrite semiconductor compounds ($CuInSe_2$, $CuGaSe_2$) [B28], which are well-known thin-film solar cell materials [B4].

Applicants have presented the discovery of a new allotrope of silicon, $Si_{24}$, formed through a novel high-pressure precursor process. The sodium concentration was found to be <0.1 atom %, the laboratory detection limit. Electrical resistivity and optical reflectivity measurements indicate that $Si_{24}$ is a semiconductor with a band gap of ~1.3 eV, in excellent agreement with our first principles calculations. The difference between $E_d$ and $E_i$ is negligibly small (<0.1 eV) and both are well within the optical band gaps for photovoltaic applications (<1.5 eV), which is a unique property of this new silicon allotrope. It is interesting that the band gap of $Si_{24}$ coincides with the theoretically proposed optimal value that maximizes solar conversion efficiency for a single p-n junction to 33.7%, namely the 'Shockley-Queisser limit' [B6]. Therefore, $Si_{24}$ appears to be a promising candidate for thin-film solar applications, which should be investigated further along with other properties such as carrier mobility and potential for light emission. The quasidirect nature of the band gap allows for greatly improved optical properties, while the material maintains advantages of silicon, e.g., potential for doping, oxide layer, etc. The synthesis of $Si_{24}$ currently requires a high-pressure precursor, which places limitations on scalability for eventual applications. However, low-pressure methods such as chemical vapor deposition could enable larger scale production of $Si_{24}$, as is the case for diamond [B29], another high-pressure phase. Furthermore, the unique nanoporous nature of this structure may be of interest for gas and/or lithium storage and for molecular-scale filtering applications. More broadly, $Si_{24}$ expands the known allotropy in element fourteen and the novel high-pressure precursor synthesis approach suggests potential for entirely new materials with desirable properties.

EXAMPLES

Synthesis $Si_{24}$ was synthesized in a two-step process. In the first step, $Na_4Si_{24}$ was synthesized from a Na/Si mixture with 15 mol % Na. The mixture was ground in a ceramic mortar for one hour inside a high-purity Ar glovebox and loaded into a Ta capsule. The capsule was then introduced in a 14/8 multianvil assembly using a Re heater and $ZrO_2$ insulation. Shorting between Ta and Re was prevented by employing $Al_2O_3$ tubes, and a W—Re C-type thermocouple, imbedded in an $Al_2O_3$ plug, was used for accurate temperature control. The mixture was pressurized in a 1500 ton multianvil press at a rate of 10 bar/hour (oil pressure) to a pressure of 10 GPa and reacted at 800° C. in two steps: preheating at 400° C. for 30 min, in order to avoid a blow-out of the overheated Na, and reaction at the final temperature for one hour, after which the sample was quenched by switching off the power. The recovered sample was easily removed from the Ta capsule and washed with distilled water. The resulting product of the reaction was polycrystalline $Na_4Si_{24}$. In the second step, polycrystalline agglomerates of $Na_4Si_{24}$ were placed in a furnace under a dynamic vacuum of $\sim 10^{-5}$ Torr and "degassed" at 125° C. for 8 days in order to obtain the empty $Si_{24}$ structure, which was subsequently washed thoroughly with water.

Powder X-Ray Diffraction

PXRD data were collected on Rigaku Rapid diffractometer with MoK radiation and curved area detector. The sample to detector distance was refined using a high purity silicon standard. Rietveld refinements were carried out using GSAS with EXPGUI software.

Electron Microscopy

EDXS measurements were performed using JEOL JSM-6500F microscope equipped with Oxford Instruments X-max detector (80 mm$^2$) and the data were analyzed using the Aztec software.

Electrical Measurements

Electrical resistivity was measured with a Physical Property Measurement System (PPMS) from Quantum Design using a two-probe method. Platinum wires (5 μm) were attached to the dense polycrystalline specimens (~50 μm in size) using Leitsilber conductive silver cement (Ted Pella, silver content 45%, sheet resistance: 0.02-0.04 ohms/square).

Optical Reflectivity

Optical reflectivity measurements were performed on polycrystalline powder samples of $Si_{24}$ using the near/mid IR light source from an Agilent Cary 670 spectrometer. Reflected light was focused into a dispersive spectrometer with CCD detector. A PTFE standard was used as a reflectance reference. Reflectivity data were processed under the Kubelka-Munk formalism and band gaps were estimated from Tauc plots.

First-Principles Calculations

For accurate band gap estimations, we have employed quasi-particle calculations (GW) and a hybrid functional approach (HSE06) for a comparison. We used Bethe-Salpeter equation (BSE) to compute the Coulomb correlation between the photoexcited electrons and holes. The full details of first principles calculations, with complete references, can be found in the Supplementary Information.

SUPPLEMENTARY INFORMATION

Electronic Structure Calculations

Electronic structure calculations and ionic relaxation were performed using Density Functional Theory (DFT) [C1, C2] with the Generalized Gradient Approximation (GGA) and Perdew, Burke, and Ernzerhof (PBE) exchange-correlation functional [C3, C4], as implemented in the Quantum ESPRESSO software [C5]. Applicants used a plane-wave basis set cutoff of 60 Ry and a Brillouin-zone integration grid of a 16×16×16 k-points.

Crystal Structure

TABLE 4

Crystallographic data for $Si_{24}$.

$Si_{24}$ - full profile refinement, MoK$_\alpha$

| Space group | Cmcm (#63) |
| --- | --- |
| a (Å) | 3.8246(5) |
| b (Å) | 10.7002(18) |
| c (Å) | 12.6476(19) |

Atomic coordinates

| | x | y | z | Occupancy | $U_{iso}$ |
| --- | --- | --- | --- | --- | --- |
| Si1 (8f) | 0 | 0.2427(8) | 0.5553(5) | 1 | 0.0176(11) |
| Si2 (8f) | 0 | 0.5718(6) | 0.3439(6) | 1 | 0.0176(11) |
| Si3 (8f) | 0 | 0.0295(6) | 0.5918(5) | 1 | 0.0176(11) |

Refinement statistics
$X^2 = 0.3889 \cdot 10^{-2}$
wRp = 0.0859 (-Bknd)
Rp = 0.0486 (-Bknd)

TABLE 5

Crystallographic data for $Si_{24}$ (DFT, PBE)

$Si_{24}$ - DFT, PBE calculations, 1 atm

| Space group | Cmcm (#63) |
| --- | --- |
| a (Å) | 3.8475 |
| b (Å) | 10.7443 |
| c (Å) | 12.7342 |

Atomic coordinates

| | x | y | z | Occupancy |
| --- | --- | --- | --- | --- |
| Si1 (8f) | 0 | 0.24285 | 0.55476 | 1 |
| Si2 (8f) | 0 | 0.57130 | 0.34274 | 1 |
| Si3 (8f) | 0 | 0.02862 | 0.59056 | 1 |

Band-Gap and Absorption Calculations

Applicants calculated band gaps for d-Si and $Si_{24}$ using several computational approaches to make it clear that $Si_{24}$ is a quasidirect band gap semiconductor. It is well-known issue that standard Density Functional Theory (PBE here) underestimates the band gap of materials. GW (where G means the single-particle Green's function and W the screened Coulomb potential) calculations were performed to correct the PBE band gap values and the Bethe-Salpeter equation (BSE) [C6, C7] was used to compute the Coulomb correlation between the photoexcited electrons and holes using the ABINIT software [C8]. Applicants conducted $GW_0$ calculations with the cutoff dielectric matrix of 5 Hartree, which was tested to various semiconductors and insulators successfully [C9]. Applicants applied BSE calculations to d-Si for testing convergence of the calculations and then calculated $Si_{24}$. For BSE calculations, applicants used a cutoff of 3.0 Hartree for the dielectric matrix.

The GW approximation was applied to the self-energy $\Sigma$ [C10, C11, C12] (the proper exchange-correlation potential acting on an excited electron or hole), which can be written as the product of the one-electron Green's function times the screened Coulomb interaction $\Sigma$=iGW. In our calculations, applicants have used both single shot $GW(G_0W_0)$ and partially self-consistent $GW_0$. It is worth noting that full correction to both G and W (GW) on d-Si overestimated the band gap significantly [C13]. As shown in Table 6, for d-Si, $G_0W_0$ and $GW_0$ give excellent agreement with the experimental band gap for d-Si (1.17 eV) and in the main text, applicants used $G_0W_0$ results. The Heyd-Scuseria-Ernzershof (HSE) exchange-correlation functional [C14] was also tested by us, which is more accurate for large band gap materials.

TABLE 6

Calculated band gaps for d-Si and $Si_{24}$ using various functionals. Units are in eV.

|  | d-Si, indirect | $Si_{24}$, indirect (direct) |
|---|---|---|
| PBE | 0.62[b] | 0.53 (0.57) |
| HSE06 | 1.28[a] | 1.41 (1.45) |
| $G_0W_0$ | 1.12 | 1.30 (1.34) |
| $GW_0$ | 1.2[b] | 1.43 (1.46) |

[a]Ref [C15],
[b]Ref [C9]

Lattice Parameter Change with Respect to Sodium Concentration

Figure 18:
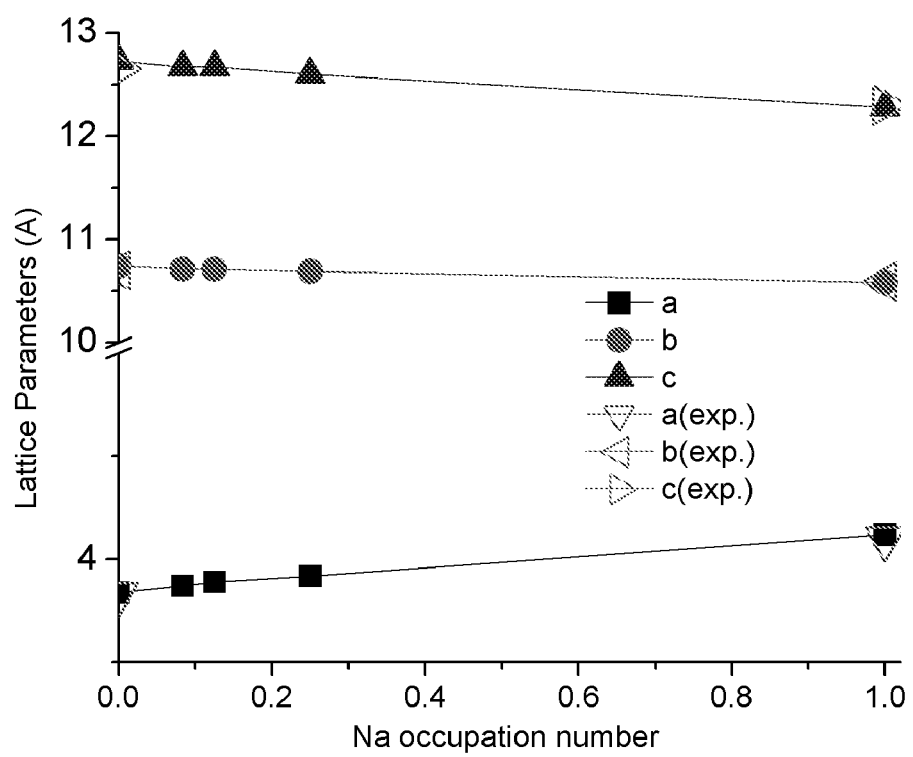
FIG. 18 is a graph of lattice parameters of $Na_xSi_{24}$ with respect to sodium concentration x.

Applicants calculated the lattice parameters, a, b, and c for $Na_xSi_{24}$ ($0 \leq x \leq 4$) at different values of x. Supercells of of $Si_{24}$ unit cells were constructed with only one sodium atom: 1x1x1 (x=0.25), 2x1x1 (x=0.125), 3x1x1 (x=0.083). Atomic positions were relaxed to determine the influence of Na content on the lattice parameters. Theoretical optimizations are in excellent agreement with experimental data for $Na_4Si_{24}$ and $Si_{24}$ (FIG. 18).

Metal-Insulator Transition in $Na_xSi_{24}$

Figure 19:
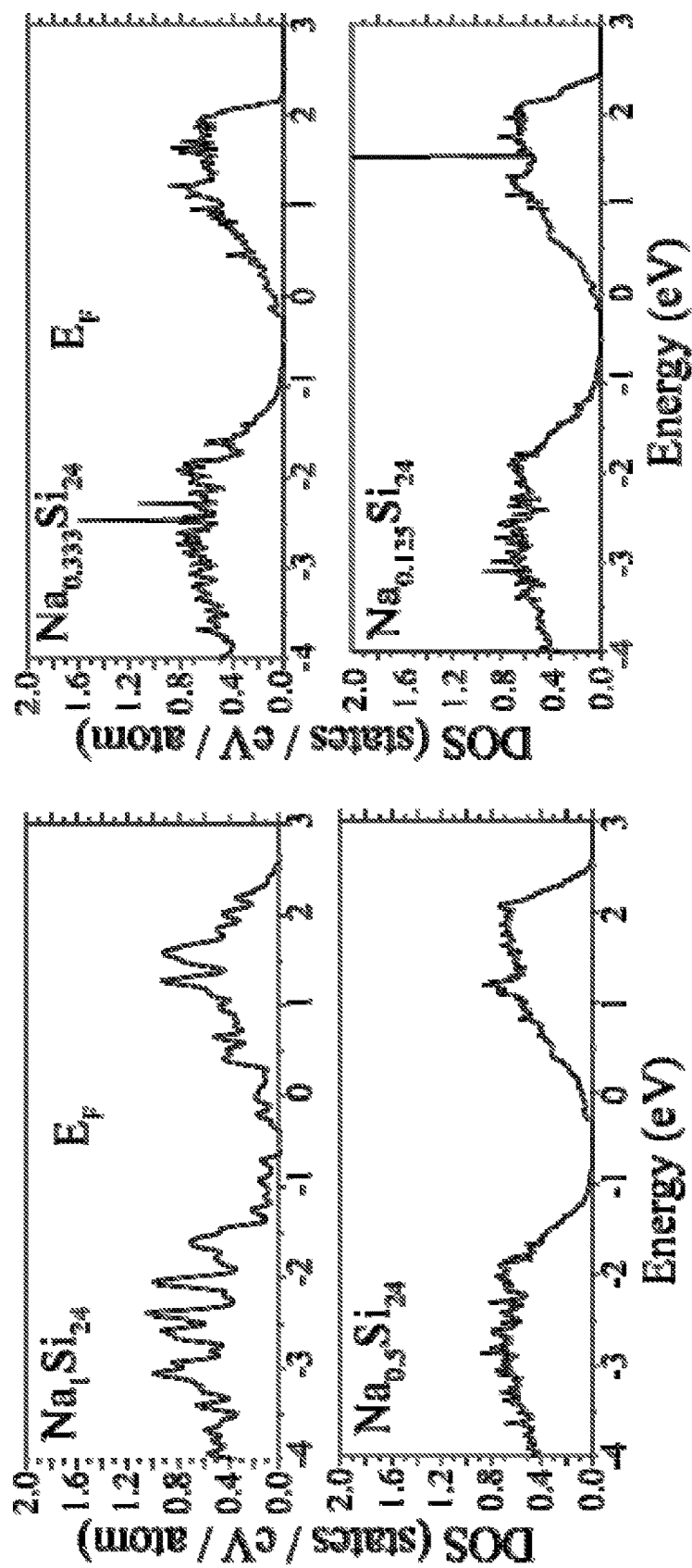
FIG. 19 shows the electronic density of state for $Na_xSi_{24}$.

Computationally, applicants checked if $Na_xSi_{24}$ becomes a semiconductor at low values of x. FIG. 19 shows the electronic density of states of $Na_1Si_{24}$, $Na_{0.5}Si_{24}$, $Na_{0.333}Si_{24}$, and $Na_{0.125}Si_{24}$. By lowering sodium concentration, the system remains metallic and there is no significant change in the number of conduction electrons at the Fermi level.

Phonon Dispersion Relations

Phonon calculations were performed using Density Functional Perturbation Theory [C16], as implemented in the Quantum-espresso package. The electronic wave function was expanded with a kinetic energy cutoff of 60 Ry. A Uniform with a 6×6×6 q-point mesh of phonon momentum has been calculated with a 12×12×12 k-point mesh.

Figure 20:
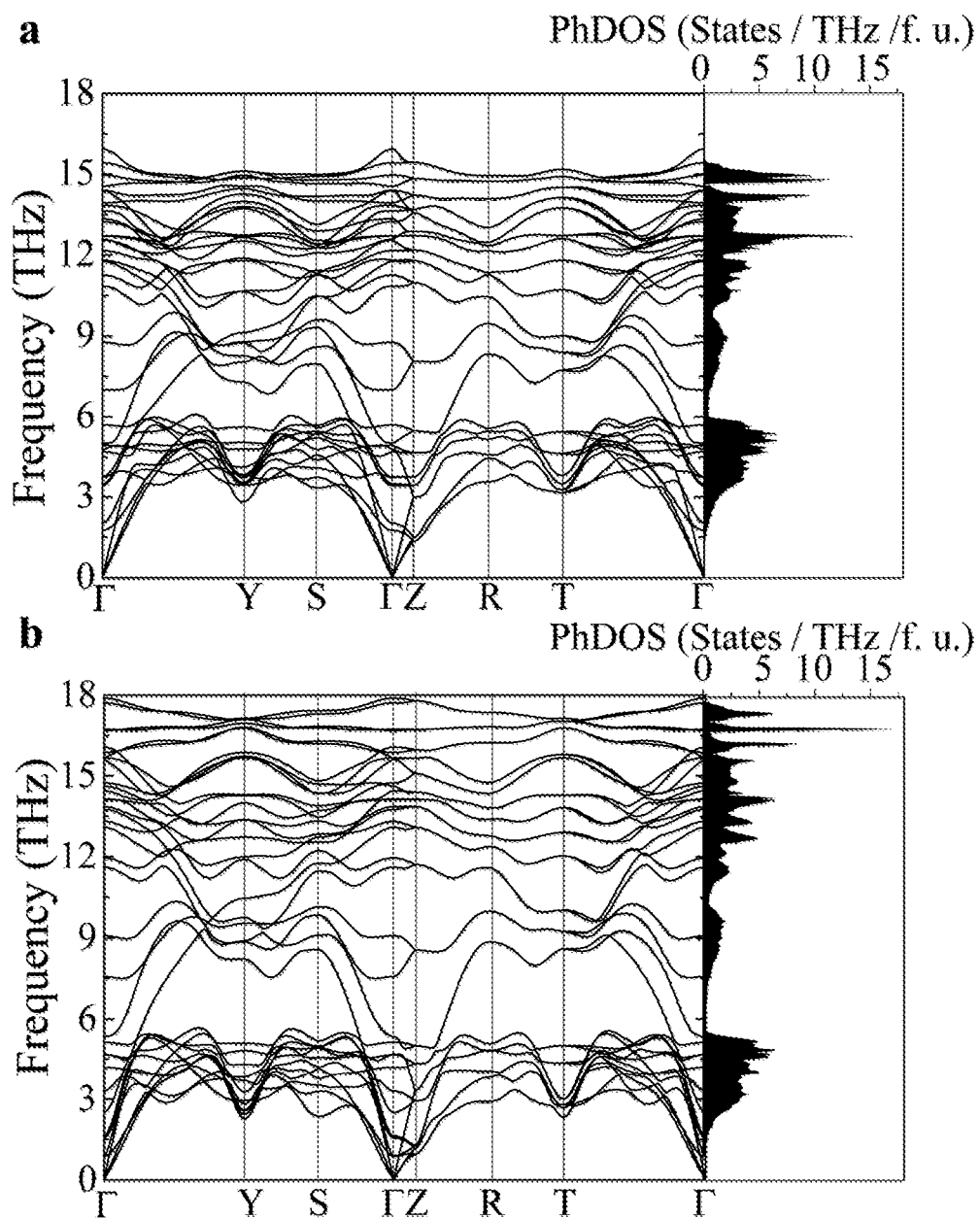
FIG. 20 shows phonon dispersion relations of $Si_{24}$ at ambient pressure (a) and 10 GPa (b).

The dynamical stability of $Si_{24}$ was examined at ambient pressure and at 10 GPa. FIG. 20 shows the evolution of the phonon dispersion relations along high symmetry lines and the corresponding phonon density of states. One can see that $Si_{24}$ is dynamically stable to 10 GPa. Above this pressure, it becomes destabilized, indicating a structural transformation.

Raman Scattering

Raman scattering data were collected from "degassed" samples $Si_{24}$. A 532 nm diode laser was used as an excitation source and focused onto the sample using a 20× long working distance objective lens. The power at the sample was approximately 10 mW. Scattered radiation was collected in the 180° back-scatter geometry and focused onto a 50 μm confocal pinhole, which served as a spatial filter. This light was then passed through two narrow-band notch filters (Ondax, SureBlock) and focused onto the entrance slit of a spectrograph (Princeton Instruments, SP2750). Light was dispersed off of an 1800 gr/mm grating and recorded using a liquid nitrogen-cooled charge-coupled device detector (Princeton Instruments, Plyon).

Figure 21:
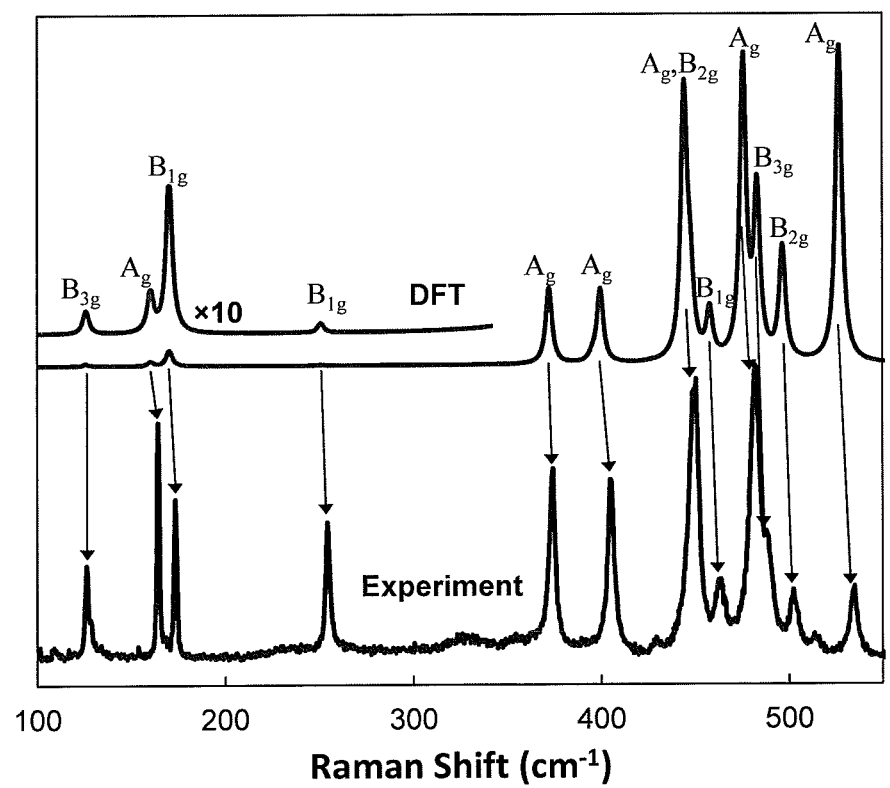
FIG. 21 provides a raman spectrum of $Si_{24}$ with experimental data (bottom) and calculated data (top). Calculated spectra are represented by Lorentzian peaks. The symmetry of each mode is indicated.

The Raman active mode was calcualted using density functional perturbation theory [C17]. A Brlliouin zone sampling grid with $2\pi \times 0.04$ Å$^{-1}$ was used with a plane basis set cutoff of 500 eV. The ionic positions were carefully relaxed at ambient pressure. FIG. 21 compares experimental and theoretical Raman data for $Si_{24}$.

Uniaxial Compression Effect on the Band Gap

Figure 22:
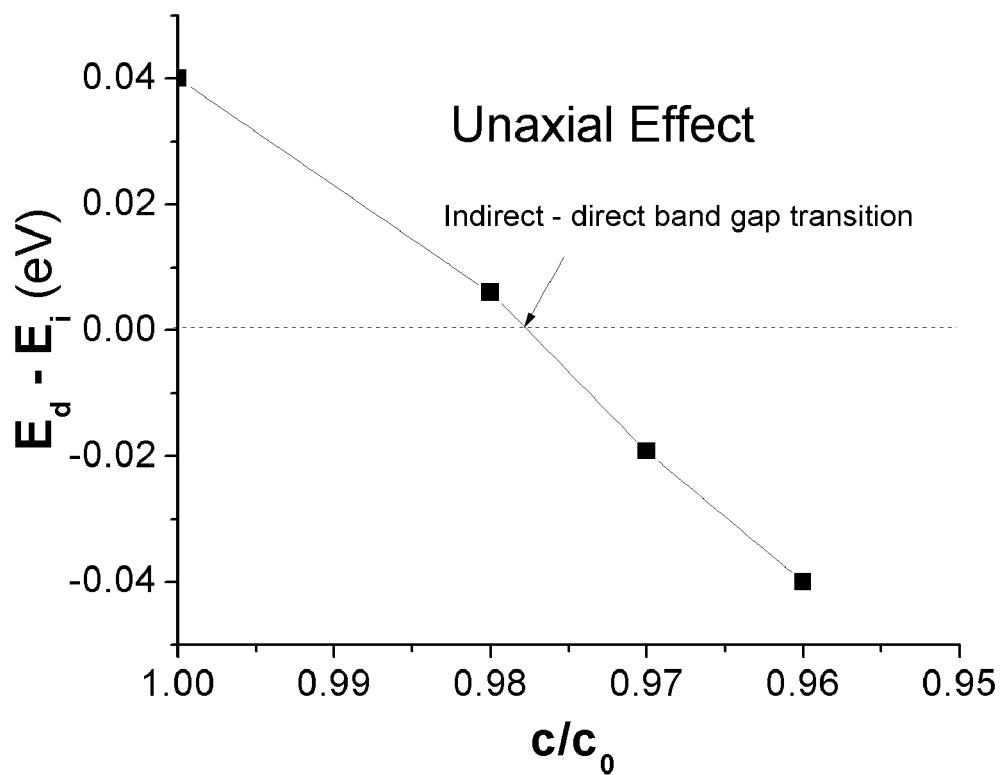
FIG. 22 shows the difference between $E_g$ and $E_i$ during uniaxial compression along c.

Strictly speaking, $Si_{24}$ is an indirect band gap material, however, electronic dispersion relations show nearly flat bands along the f to Z direction. Due to the small difference between $E_d$ and $E_i$, applicants examined band gap changes during uniaxial compression of $Si_{24}$ along c-axis. The difference between the direct and indirect band gaps ($E_d-E_i$) is shown in FIG. 22. An indirect-to-direct band gap transition occurs when the initial lattice constant, $c_0$, is reduced by ~2%.

REFERENCES

1. Kasper, J. S. et al., Clathrate structure of silicon $Na8Si_{46}$ and $NaxSi_{136}$ (x<11), Science, 150, 1713-1714 (1965).
2. Sloan, E. D. Jr. et al., Clathrate hydrates of natural gases; CRC Press: Boca Raton, Fla., (2008).
3. San-Miguel, A. et al., High pressure behavior of silicon clathrates: A new class of low compressibility materials, Phys. Rev. Lett., 83, 5290-5293 (1999)
4. San-Miguel, A. et al., High-pressure properties of group IV clathrates, High Pressure Res., 25, 159-185 (2005).
5. Cohn, J. L. et al., Glasslike heat conduction in high-mobility crystalline semiconductors, Phys. Rev. Lett., 82, 779-782 (1999).
6. Beekman, M. et al., Inorganic clathrate-II materials of group 14: synthetic routes and physical properties, S. J. Mater. Chem., 18, 842-851 (2008).
7. Tanigaki, K. et al., Mechanism of superconductivity in the polyhedral-network compound $Ba_8Si_{46}$, Nature Materials, 2, 653-655 (2003).
8. Kawaji, H. et al., Superconductivity in the silicon clathrate compound $(Na,Ba)_xSi_{46}$, Physical Review Letters, 74, 1427-1429 (1995).
9. Neiner, D. et al., Hydrogen encapsulation in a silicon clathrate type I structure: $Na_{5.5}(H2)_{2.15}Si_{46}$: synthesis and characterization, Journal of the American Chemical Society, 129, 13857-13862 (2007).
10. Beekman, M. et al., Preparation and crystal growth of $Na_{24}Si_{136}$, Journal of the American Chemical Society, 131, 9642-9643 (2009).
11. Yamanaka, S., Silicon clathrates and carbon analogs: high pressure synthesis, structure, and superconductivity, Dalton Transactions, 39, 1901-1915 (2010).
12. Bohme, B. et al., Synthesis of the intermetallic clathrate $Na_2Ba_6Si_{46}$ by oxidation of $Na_2BaSi_4$ with HCl, Sci. Technol. Adv. Mater., 8, 410-415 (2007).
13. Stefanoski, S. et al., Synthesis and structural characterization of single-crystal $K_{7.5}Si_{4.6}$ and $K_{17.8}Si_{36}$ Clathrates, Crystal Growth & Design, 11, 4533-4537 (2011).
14. Perottoni, C. A. et al., The carbon analogues of type-I silicon clathrates, J. Phys.: Condens. Matter, 13, 5981-5998 (2001).
15. McMillan, P. F., New materials from high-pressure experiments, Nature Material, 1, 19-25 (2002).
16. Yamanaka, S. et al., High-Pressure Synthesis of a New Silicon Clathrate Superconductor, $Ba_8Si_{46}$, M. Inorg. Chem., 39, 56-58 (2000).
17. Reny, E. et al., High pressure synthesis of an iodine doped silicon clathrate compound, M. Chem. Commun., 24, 2505-2506 (2000).

18. Morito, H. et al., Na—Si binary phase diagram and solution growth of silicon crystals, Alloys Compd., 480, 723-726 (2009).
19. Hutchins, P. T. et al., Time-resolved in situ synchrotron x-ray diffraction studies of type 1 silicon clathrate formation, Chem. Mater., 23, 5160-5167 (2011).
20. Toulemonde, P. et al., High pressure synthesis and properties of intercalated silicon clathrates, J. Phys. Chem. Solids, 67, 1117-1121 (2006).
21. Bundy, F. P. et al., High pressure synthesis and properties of intercalated silicon clathrates, Nature, 176, 51-55 (1955).
22. Solozhenko, V. L. et al., Ultimate metastable solubility of boron in diamond: synthesis of superhard diamondlike BC5, M. Phys. Rev. Lett., 102, 015506 (2009).
23. Wentorf, H. R., Jr. Chem. Phys., Cubic form of boron nitride, 26, 956-960 (1957).
24. Solozhenko, V. L. et al., Creation of nanostructures by extreme conditions: high-pressure synthesis of ultrahard nanocrystalline cubic boron nitride, Adv. Mater., 24, 1540-1544 (2012).
25. Oganov, A. R. et al., Ionic high-pressure form of elemental boron, Nature, 457, 863-867 (2009).
26. Bertka, C. M., et al., Mineralogy of the Martian interior up to core-mantle boundary pressures, Geophys. Res., 102, 5251-5264 (1997).
27. Reny, E. et al., Structural characterizations of the $Na_xSi_{136}$ and $Na_8Si_{46}$ silicon clathrates using the Rietveid method, J. Mater. Chem., 8, 2839-2844 (1998).
28. Beekman, M., et al., Framework contraction in Na-Stuffed Si(cF136), Inorg. Chem., 49, 5338-5340 (2010).
29. Kurakevych, O. O. et al., Comparison of solid-state crystallization of boron polymorphs at ambient and high pressures, High Pressure Res., 32, 30-38 (2012).
30. Byran, J. D. et al., $Eu_4Ga_8Ge_{16}$: A new four-coordinate clathrate network, G. D. Chem. Mater., 13, 253-257 (2001).
31. Yamanaka, S. et al., Structural evolution of the binary system Ba—Si under high-pressure and high-temperature conditions, Zeitschrift Fur Naturforschung Section B-A Journal of Chemical Sciences, 61, 1493-1499 (2006).
32. Wosylus, A. et al., High-pressure synthesis of strontium hexasilicide, Naturforsch, 61, 1485-1492 (2006).
33. Wosylus, A. et al., High-pressure synthesis of the electron-excess compound $CaSi_{24}$, U. Sci. Technol. Adv. Mater., 8, 383-388 (2007).
34. Khyvostantsev, L. G. et al., Toroid type high-pressure device: history and prospects, High Pressure Research, 24, 371-383 (2004).
35. Stefanoski, S. et al., Synthesis and structural characterization of $Na_xSi_{136}$ (0<x≤24) single crystal and low-temperature transport of polycrystalline specimens, Inorg. Chem., 51, 8686-8692 (2012).
36. Stefanoski, S. et al., Low temperature transport properties and heat capacity of single-crystal $Na_8Si_{46}$, J. Phys. Condens. Matter, 22, 485404 (2010).
37. Stefanoski, S. et al., Simple approach for selective crystal growth of intermetallic clathrates, Chem. Mater., 23, 1491-1495 (2012).
38. Hohenberg, P. et al., Inhomogeneous electron gas, Phys. Rev., 136, B864-B871 (1964).
39. Perdew, J. P. et al., Atoms, molecules, solids, and surfaces: Applications of the generalized gradient approximation for exchange and correlation, Phys. Rev. B, 46, 6671-6687 (1992).
40. Monkhorst, H. J. et al., Special points for brillouin-zone integrations, Phys. Rev. B, 13, 5188-5192 (1976).
41. Baroni, S. et al., Phonons and related crystal properties from density-functional perturbation theory, Rev. Mod. Phys., 73, 515-562 (2001).
B1. Ng, W. L. et al., An efficient room-temperature silicon-based light-emitting diode, Nature, 410, 192-194 (2001).
B2. Theis, T. N. et al., It's time to reinvent the transistor, Science, 327, 1600-1601 (2010).
B3. Fujita, M., Silicon photonics: Nanocavity brightens silicon, Nature Photonics, 7, 264-265 (2013).
B4. Botti, S. et al., Low-energy silicon allotropes with strong absorption in the visible for photovoltaic applications, Phys. Rev. B, 86, 121204(R) (2012).
B5. Kurakevych, O. O. et al., Na—Si Clathrates are high-pressure phases: a melt-based route to control stoichiometry and properties, Cryst. Growth Des., 13, 303-307 (2013).
B6. Shockley, W. et al., Detailed balance limit of efficiency of pn junction solar cells, J. Appl. Phys., 32, 510-519 (1961).
B7. Zwijnenburg, M. A. et al., An extensive theoretical survey of low-density allotropy in silicon, Phys. Chem. Chem. Phys., 12, 8505-8512 (2010).
B8. Xiang, H. J. et al., Towards direct-gap silicon phases by the inverse band structure approach, Phys. Rev. Lett., 110, 118702 (2013).
B9. Malone, B. D. et al., Prediction of a metastable phase of silicon in the Ibam structure, Phys. Rev. B, 85, 024116 (2012).
B10. Tonkov, E. Y. et al., Phase transformations of elements under high pressure, CRC Press, LLC (2005).
B11. Wentorf, R. H. et al., Two New Forms of Silicon, Science, 139, 338-339 (1963).
B12. Cros, C. et al., deux nouvelles phases du systerne silicium-sodium, C. R. Acad., Sci., Paris 260, 4764 (1965).
B13. Gryko, J. et al., Low-density framework form of crystalline silicon with a wide optical band gap, Phys. Rev. B, 62, R7707-R7710 (2000)
B14. Kasper, J. S. et al., Clathrate structure of silicon $Na8Si_{46}$ and $NaxSi_{136}$ (x<11), Science, 150, 1713-1714 (1965).
B15. Schnering, H. V. et al., The lithium sodium silicide $Li_3NaSi_6$ and the formation of allo-silicon, Journal of the Less Common Metals, 137, 297-310 (1988).
B16. Malone, B. D. et al., Ab initio survey of the electronic structure of tetrahedrally bonded phases of silicon, Phys. Rev., B 78, 035210 (2008).
B17. Besson, J. M. et al., Electrical properties semimetallic silicon III and semiconductive silicon IV at ambient pressure, Phys. Rev. Lett., 59, 473-476 (1987).
B18. Dong, J. et al., Theoretical study of the vibrational modes and their pressure dependence in the pure clathrate-II silicon framework, Phys. Rev. B, 60, 950-958 (1999).
B19. Guloy, A. M. et al., A guest-free germanium clathrate, Nature, 443, 320-323 (2006).
B20. Connétable, D. Structural and electronic properties of p-doped silicon clathrates, Phy. Rev. B, 75, 125202 (2007).
B21. Stefanoski, S. et al., Synthesis and structural characterization of $Na_xSi_{136}$ (0<x≤24) single crystal and low-temperature transport of polycrystalline specimens, Inorg. Chem., 51, 8686-8692 (2012).
B22. San-Miguel, A. et al., High pressure behavior of silicon clathrates: A new class of low compressibility materials, Phys. Rev. Lett., 83, 5290-5293 (1999)

B23. Tritt, T. M. Semiconductors and semimetals, 69, Academic Press, San Diego, (2001).

B24. Tauc, J. et al., Optical properties and electronic structure of amorphous germanium, Phys. Status Solidi, 15, 627-637 (1966).

B25. Salpeter, E. E. et al., A relativistic equation for bound-state problems, Phys. Rev., 84, 1232-1242 (1951).

B26. Albrecht, S. et al., Ab Initio calculation of excitonic effects in the optical spectra of semiconductors, Phys. Rev. Lett., 80, 4510-4513 (1998).

B27. Reference Solar Spectral Irradiance: Air Mass 1.5, http://rredc.nrel.gov/solar/spectra/am1.5

B28. Alonso, M. I. et al., Optical functions and electronic structure of $CuInSe_2$, $CuGaSe_2$, $CuInS_2$, and $CuGaS_2$, Phys. Rev. B, 63, 075203 (2001).

B29. Meng, Y. et al., High optical quality multicarat crystal diamond produced by chemical vapor deposition, Physica Stat. Solidi (a), 209, 101-104 (2012).

C1. Hohenberg, P. et al., Inhomogeneous electron gas, Phys. Rev., 136, C864-C871 (1964).

C2. Kohn, W. et al., Self-consistent equations including exchange and correlation effects, Phys. Rev., 140, A1133-A1138 (1965).

C3. Perdew, J. P. et al., Atoms, molecules, solids, and surfaces: Applications of the generalized gradient approximation for exchange and correlation, Phys. Rev. B, 46, 6671-6687 (1992).

C4. Perdew, J. P. et al., Generalized gradient approximation made simple, Phys. Rev. Lett, 77, 3865-3868 (1996).

C5. Giannozzi, P. et al., QUANTUM ESPRESSO: a modular and open-source software project for quantum simulations of materials, J. Phys. Condens, Matter 21, 395502 (2009).

C6. Salpeter, E. E. et al., A relativistic equation for bound-state problems, Phys. Rev., 84, 1232-1242 (1951).

C7. Albrecht, S. et al., Ab Initio calculation of excitonic effects in the optical spectra of semiconductors, Phys. Rev. Lett., 80, 4510-4513 (1998).

C8. Gonze, X. et al., ABINIT: First-principles approaches to materials and nanosystem properties, Computer Phys. C:ommun., 180, 2582-2615 (2009).

C9. Tran, F. et al., Accurate band gaps of semiconductors and insulators with a semilocal exchange-correlation potential, Phys. Rev. Lett., 102, 226401 (2009).

C10. Hedin, L., New method for calculating the one-particle green's function with application to the electron-gas problem, Phys. Rev., 139, A796 (1965).

C11. Hedin, L. et al., Solid state physics, H. Ehrenreich, F. Seitz, D. Turnbull, Eds. (Academic, New York, 1969), 1, pp. 23.

C12. Onida G. et al., Electronic excitations: density-functional versus many-body Green's-function approaches, Rev. Mod. Phys., 74, 601-659 (2002).

C13. Schöne, W. D. et al., self-consistent calculations of quasiparticle states in metals and semiconductors, Phys. Rev. Lett., 81, 1662-1665 (1998).

C14. Heyd, J. et al., Energy band gaps and lattice parameters evaluated with the Heyd-Scuseria-Ernzerhof screened hybrid functional, J. Chem. Phys., 123, 174101 (2005).

C15. Shishkin, M. et al., Self-consistent GW calculations for semiconductors and insulators, Phys. Rev. B, 75, 235102 (2007).

C16. Baroni, S. et al., Phonons and related crystal properties from density-functional perturbation theory, Rev. Mod. Phys., 73, 515-562 (2001).

C17. Refson, K. et al., Variational density-functional perturbation theory for dielectrics and lattice dynamics, Phys. Rev. B, 73, 155114 (2006).

As the present invention may be embodied in several forms without departing from the spirit or essential characteristics thereof, it will be understood that the invention is not limited by the details of the foregoing description, unless otherwise specified, but rather should be construed broadly within its spirit and scope as defined in the appended claims, and therefore all changes and modifications that fall within the metes and bounds of the claims. Accordingly, the invention is defined by the appended claims.

The invention claimed is:

1. A method of producing $Si_{24}$ comprising:
   forming an $Na_4Si_{24}$ precursor by reacting a mixture of silicon and sodium at a pressure from about 7 GPa to about 15 GPa and a temperature from about 320° C. to about 1500° C.;
   subjecting the $Na_4Si_{24}$ precursor to vacuum conditions at a temperature from about 40° C. to about 500° C. to produce $Si_{24}$.

2. The method of claim 1, wherein the precursor $Na_4Si_{24}$ is dynamically stable at a temperature of about 25° C. and a pressure of about 1 atmosphere.

3. The method of claim 1 wherein the $Na_4Si_{24}$ precursor contains 24 silicon atoms and 4 sodium atoms, has a space group of Cmcm, and has the following lattice constants: a=4.106 Å, b=10.563 Å and c=12.243 Å.

4. The method of claim 1 wherein $Si_{24}$ has a quasi-direct band gap, with a direct gap value of 1.34 eV and an indirect gap value of 1.3 eV.

5. The method of claim 1 wherein the ratio of sodium to silicon used to form $Na_4Si_{24}$ is from about 10 to about 30 mol %.

6. The method of claim 1 wherein the mixture of sodium and silicon is heated in two steps, first to about 400° C. for about 30 minutes and second to about 800° C. for about 1.5 to 24 hours.

7. A method of producing $Na_4Si_{24}$ by reacting a mixture of silicon and sodium at a pressure of greater than about 8 GPa and a temperature of greater than about 700° C.

8. The method of claim 7 wherein $Na_4Si_{24}$ contains 24 silicon atoms and 4 sodium atoms, has a space group of Cmcm, and has the following lattice constants: a=4.106 Å, b=10.563 Å and c=12.243 Å.

9. The method of claim 7 wherein the ratio of sodium to silicon in the reaction is about 20 mol %.

10. A compound of the formula $Si_{2.4}$ having an orthorhombic structure.

11. The compound of claim 10 wherein the compound, has a space group of Cmcm (#63).

12. The compound of claim 11 having the following lattice constants: a=3.83 Å, b=10.69 Å and c=12.63 Å.

13. The compound of claim 10 having an indirect band gap of 1.3 eV and a direct band gap of 1.34 eV.

14. A compound of the formula $Na_4Si_{24}$.

15. The compound of claim 14 which is dynamically stable at a temperature of about 25° C. and a pressure of about 1 atmosphere.

16. The compound of claim 14 wherein $Na_4Si_{24}$ contains 24 silicon atoms and 4 sodium atoms; has a space group of Cmcm; and has the following lattice constants: a=4.106 Å, b=10.563 Å and c=12.243 Å.

* * * * *

UNITED STATES PATENT AND TRADEMARK OFFICE
CERTIFICATE OF CORRECTION

PATENT NO. : 9,695,051 B2
APPLICATION NO. : 14/903131
DATED : July 4, 2017
INVENTOR(S) : Strobel et al.

Page 1 of 1

It is certified that error appears in the above-identified patent and that said Letters Patent is hereby corrected as shown below:

In the Claims

Column 22, Line 48, please correct Claim 10 as follows:
10. A compound of the formula $Si_{24}$ having an orthorhombic structure.

Signed and Sealed this
Fourth Day of June, 2019

Andrei Iancu
*Director of the United States Patent and Trademark Office*